(12) United States Patent
Komiya et al.

(10) Patent No.: US 9,028,683 B2
(45) Date of Patent: May 12, 2015

(54) PACKING MATERIAL WITH EXCELLENT HYDROPHILICITY AND PROCESS FOR PRODUCING THE SAME

(75) Inventors: Katsuo Komiya, Hikari (JP); Yuji Kubo, Shunan (JP); Masazumi Hasegawa, Suzuka (JP); Sanae Hasegawa, legal representative, Suzuka (JP)

(73) Assignee: Tosoh Corporation, Shunan-shi (JP)

( * ) Notice: Subject to any disclaimer, the term of this patent is extended or adjusted under 35 U.S.C. 154(b) by 2098 days.

(21) Appl. No.: 11/917,060

(22) PCT Filed: Jun. 8, 2006

(86) PCT No.: PCT/JP2006/311556
§ 371 (c)(1),
(2), (4) Date: May 14, 2009

(87) PCT Pub. No.: WO2006/132333
PCT Pub. Date: Dec. 14, 2006

(65) Prior Publication Data
US 2010/0029914 A1 Feb. 4, 2010

(30) Foreign Application Priority Data
Jun. 9, 2005 (JP) .................................. 2005-169111

(51) Int. Cl.
*B01J 41/14* (2006.01)
*C08F 220/26* (2006.01)
*B01J 39/20* (2006.01)
*C08F 220/60* (2006.01)
*B01J 41/20* (2006.01)
*B01J 39/26* (2006.01)
*C08F 220/32* (2006.01)
*C08G 81/02* (2006.01)
*C08F 222/10* (2006.01)

(52) U.S. Cl.
CPC ............. *B01J 41/14* (2013.01); *C08F 2800/20* (2013.01); *C08F 220/26* (2013.01); *C08F 222/1006* (2013.01); *B01J 39/20* (2013.01); *C08F 220/60* (2013.01); *C08F 2810/20* (2013.01); *B01J 41/20* (2013.01); *B01J 39/26* (2013.01); *C08F 220/32* (2013.01); *C08G 81/02* (2013.01)

(58) Field of Classification Search
CPC ............ B01J 39/20; B01J 39/26; B01J 41/14; B01J 41/20; C08G 81/02; C08F 220/60; C08F 220/32; C08F 220/26; C08F 8/12; C08F 8/30; C08F 8/00; C08F 220/20; C08F 271/00; C08F 8/34; C08F 8/44; C08F 2810/20; C08F 2800/20; C08F 222/1006; C08F 2220/325

USPC ............ 210/635, 656, 198.2, 502.1; 502/402
See application file for complete search history.

(56) References Cited

U.S. PATENT DOCUMENTS

| | | | |
|---|---|---|---|
| 4,118,347 A | 10/1978 | Ishiguro et al. | |
| 4,340,483 A | 7/1982 | Lukás et al. | |
| 4,913,812 A * | 4/1990 | Moriguchi et al. | ........ 210/198.2 |
| 5,373,052 A * | 12/1994 | Fukuda et al. | ............... 525/54.1 |
| 5,453,186 A * | 9/1995 | Muller et al. | .............. 210/198.2 |
| 5,578,695 A * | 11/1996 | Isozaki | ......................... 528/271 |
| 5,670,049 A * | 9/1997 | Muller et al. | ................. 210/635 |
| 6,489,396 B2 * | 12/2002 | Nakamura et al. | ............ 525/117 |
| 2002/0072565 A1* | 6/2002 | Muranaka et al. | ............. 524/832 |
| 2005/0165159 A1* | 7/2005 | Ogura et al. | .................. 524/560 |

FOREIGN PATENT DOCUMENTS

| | | |
|---|---|---|
| EP | 0 467 339 A1 | 1/1992 |
| JP | 53-90991 | 8/1978 |
| JP | 58-58026 | 12/1983 |
| JP | 63-68616 | 3/1988 |
| JP | 2-196810 | 8/1990 |
| JP | 3-255111 | 11/1991 |
| JP | 4-353501 | 12/1992 |
| JP | 5-9233 | 1/1993 |
| JP | 2001-2716 | 1/2001 |

OTHER PUBLICATIONS

PTO Translation No. 11-3021 of Japan Patent No. 04353501.*
PTO Translation No. 11-3020 of Japan Patent No. 03255111.*

* cited by examiner

*Primary Examiner* — Ernest G Therkorn
(74) *Attorney, Agent, or Firm* — Oblon, McClelland, Maier & Neustadt, L.L.P.

(57) ABSTRACT

To provide a medium suitable for high speed/high resolution, rich in hydrophilicity and resistant to a high concentration aqueous alkaline solution.

A medium comprising crosslinked polymer particles containing from 20 to 95 mol % of repeating units derived from a (meth)acryloyl monomer represented by the formula (1):

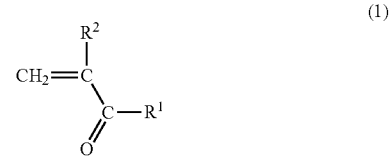

wherein $R^2$ is a hydrogen atom or a $C_{1-4}$ alkyl group, $R^1$ is $-NR^3-R^4-R^5$ or $-O-R^4-R^5$, $R^3$ is a hydrogen atom or a $C_{1-4}$ alkyl group, $R^4$ is a $C_{6-15}$ alkylene group containing an alicyclic ring or a $C_{4-8}$ linear alkylene group, and $R^5$ is a halogen atom, an alcoholic OH group, an amino group, a glycidyl group or an epoxy group.

12 Claims, No Drawings

PACKING MATERIAL WITH EXCELLENT HYDROPHILICITY AND PROCESS FOR PRODUCING THE SAME

REFERENCE TO RELATED APPLICATIONS

This application is a 371 of PCT/JP2006/311556 filed Jun. 8, 2006.

TECHNICAL FIELD

The present invention relates to a medium comprising an organic compound, having an effect of absorbing/desorbing substances (particularly proteins) dissolved in an aqueous solution and suitable for collection of an aimed substance and for separation and purification by liquid chromatography. More particularly, it relates to a novel medium having high chemical stability against a high concentration aqueous alkaline solution, excellent in hydrophilicity and useful for separation and purification of proteins.

BACKGROUND ART

As a medium for chromatography to be used for adsorption, separation and purification of proteins, an inorganic medium represented by a silica compound or the like and an organic medium comprising an organic polymer may be mentioned. The organic medium is roughly classified into a synthetic medium using a synthetic compound represented by a (meth)acrylate and a (meth)acrylamide, and a natural medium using a natural polysaccharide represented by agarose, dextran, mannan or the like.

A synthetic medium is usually produced, for example, by suspension polymerization method using a mixed liquid of a monofunctional monomer with a polyfunctional monomer, such as glycidyl methacrylate with ethylene glycol dimethacrylate, followed by hydrophilization by a water soluble polyhydric alcohol or the like to produce a substrate. By the progress of hydrophilization technology in synthetic media in recent years, a process for producing a synthetic medium comparable to a natural medium in view of hydrophilicity has been found. Further, the process is usually a process for producing particles by suspension polymerization using a monofunctional monomer and a polyfunctional monomer, a hard medium and a flexible medium can be freely designed by adjusting the amount of addition of the polyfunctional monomer. However, with a view to producing a medium which is hard and which is not fragile, in the case of a synthetic medium, it is common to produce a medium by using a (meth)acrylate or (meth)acrylamide monomer with which a polymer having a high molecular weight is easily obtained. Further, with a view to easily attaching a ligand which interacts with proteins after formation into particles, many media using a so-called glycidyl methacrylate (GMA) monomer having a glycidyl group to be the reaction site have been proposed.

As described above, the main purpose of use of such a medium is separation and purification of proteins by liquid chromatography. The main purpose of use of the purified proteins is pharmaceutical preparations (injectable protein preparations), and in this field, it is required to completely avoid risks of side effects by contamination by contaminants.

The contaminants which may be included may, for example, be (1) contaminants derived from the aimed protein production process, such as foreign proteins, nucleic acids, endotoxins and viruses contained in culture solutions, blood sera, etc., (2) contaminants from components necessary for production and storage, such as additives, and from equipment, media, separation membranes, solutions, etc. used in the purification step, and (3) components which have been adsorbed on and not eluted from the medium in the previous purification.

The medium is packed in a column and used in a purification step, and it is necessarily washed with a verified washing method before first use and before reuse. The most common method of washing the interior of an apparatus in the purification step is washing with 1N sodium hydroxide, which can decompose and wash away proteins, endotoxins, etc. This washing method is recommended as a guideline of Food and Drug Administration, and is effective at the first use and at the reuse. That is, in GMP facility to carry out purification of pharmaceutical proteins, it is commonly carried out to wash the interior of the column apparatus before each batch of use. Further, in a case where there is an interval between batches, the apparatus may be filled with an aqueous sodium hydroxide solution diluted to 0.01N to 0.1N to shut off the apparatus in some cases. Further, to remove abnormal proteins such as prion, washing with an aqueous sodium hydroxide solution at a higher concentration (e.g. a concentration of 2N) is required.

However, a GMA monomer has an ester moiety showing high hydrophilicity and accordingly hydrolysis of ester proceeds by a long time contact with an alkaline chemical, whereby an alcohol compound is released to form a carboxylic acid. There will be no problem if the released alcohol compound can be completely removed by washing, but if it can not be removed, it may be a contaminant. Further, by formation of a carboxylic acid, the original properties of the medium may change, and the reproducibility of separation and purification will disappear, thus leading to poor purity. That is, a medium having low alkali resistance not only has a short period of use by deterioration of properties but also has problems such as risks of unknown elutes, risks of contamination by elution at the time of purification operation and poor purity by deterioration of properties.

As described above, although a synthetic medium is hard (has high mechanical strength) and is thereby has such an advantage that it is suitable for high speed/high separation, and has such an advantage of high hydrophilicity, development of a synthetic medium having alkali resistance has been expected at present.

Patent Document 1: JP-B-58-058026
Patent Document 2: JP-A-53-090991
Patent Document 3: JP-A-05-009233

DISCLOSURE OF THE INVENTION

Object to be Accomplished by the Invention

Under these circumstances, the object of the present invention is to provide a medium suitable for high speed/high separation, rich in hydrophilicity and resistant to a high concentration aqueous alkaline solution. More particularly, it is to provide a novel medium having mechanical strength applicable to high speed/high separation, having sufficient hydrophilicity not to cause nonspecific adsorption of proteins and providing a small change in a protein adsorbing amount, holding power, etc. even when immersed in a high concentration aqueous alkaline solution.

Means to Accomplish the Object

The present inventors have conducted extensive studies to accomplish the above object and as a result, found that a medium using, as a monomer, a compound having a specific structure among polymerizable (meth)acryloyl compounds, has alkali resistance. The present invention has been accomplished on the basis of this discovery.

Namely, the present invention resides in a novel medium excellent in hydrophilicity, its production process, and a method of separating proteins by using it, as described hereinafter.

1. A medium comprising crosslinked polymer particles containing from 20 to 95 mol % of repeating units derived from a (meth)acryloyl monomer represented by the following formula (1):

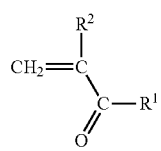

(1)

wherein $R^2$ is a hydrogen atom or a $C_{1-4}$ alkyl group, $R^1$ is —$NR^3$-$R^4$-$R^5$ or —O—$R^4$-$R^5$, $R^3$ is a hydrogen atom or a $C_{1-4}$ alkyl group, $R^4$ is a $C_{6-15}$ alkylene group containing an alicyclic ring, or a $C_{4-8}$ linear alkylene group, and $R^5$ is a halogen atom, an alcoholic OH group, an amino group, a glycidyl group or an epoxy group, provided that when $R^5$ is an epoxy group, the epoxy group may directly be introduced to a part of the alicyclic ring contained in $R^4$ or may be added in the form of a pendant to the alicyclic ring, and when $R^5$ is a glycidyl group, it is bonded to $R^4$ in the form of a glycidyl ether.

2. The medium according to the above 1, comprising crosslinked polymer particles containing from 20 to 95 mol % of repeating units derived from the (meth)acryloyl monomer represented by the above formula (1) and 80 to 5 mol % of repeating units derived from a polyfunctional monomer.

3. The medium according to the above 1 or 2, comprising crosslinked polymer particles obtained by polymerizing the (meth)acryloyl monomer represented by the above formula (1) and a polyfunctional monomer.

4. A medium comprising crosslinked polymer particles containing from 20 to 95 mol % of repeating units represented by the following formula (2):

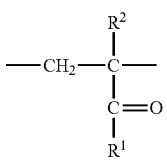

(2)

wherein $R^2$ is a hydrogen atom or a $C_{1-4}$ alkyl group, $R^1$ is —$NR^3$-$R^4$-$R^5$ or —O—$R^4$-$R^5$, $R^3$ is a hydrogen atom or a $C_{1-4}$ alkyl group, $R^4$ is a $C_{6-15}$ alkylene group containing an alicyclic ring, or a $C_{4-8}$ linear alkylene group, and $R^5$ is a halogen atom, an alcoholic OH group, an amino group, a glycidyl group or an epoxy group, provided that when $R^5$ is an epoxy group, the epoxy group may directly be introduced to a part of the alicyclic ring contained in $R^4$ or may be added in the form of a pendant to the alicyclic ring, and when $R^5$ is a glycidyl group, it is bonded to $R^4$ in the form of a glycidyl ether; and from 80 to 5 mol % of repeating units represented by the following formula (3):

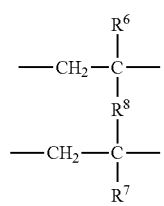

(3)

wherein each of $R^6$ and $R^7$ which are independent of each other, is a hydrogen atom or a $C_{1-3}$ alkyl group, and $R^8$ is a bivalent organic group having an aryl group, an oxycarbonyl group or a carbamoyl group.

5. The medium according to any one of the above 1 to 4, wherein the crosslinked polymer particles are porous particles having an average particle size of from 5 to 300 μm.

6. A process for producing the medium as defined in any one of the above 1 to 5, which comprises suspending a monomer mixture containing from 20 to 95 mol % of the (meth)acryloyl monomer represented by the above formula (1) and a crosslinking agent, and a suspension stabilizer, in an aqueous phase, followed by polymerization.

7. A process for producing the medium as defined in any one of the above 1 to 5, which comprises suspending a monomer mixture containing from 20 to 95 mol % of the (meth)acryloyl monomer represented by the above formula (1) and from 80 to 5 mol % of a polyfunctional monomer, and a suspension stabilizer, in an aqueous phase, followed by polymerization.

8. The process for producing the medium according to the above 6 or 7, wherein the (meth)acryloyl monomer represented by the above formula (1) is at least one member selected from the group consisting of 3,4-epoxycyclohexylmethyl methacrylate, 1,3-hydroxyadamantane-1-methacrylate, 1,4-cyclohexanedimethanol monoacrylate, 1,4-hydroxybutyl acrylate, 4-hydroxybutyl acrylate glycidyl ether, 4-bromobutyl methacrylate and 6-aminohexyl methacrylamide.

9. The process for producing the medium according to the above 7, wherein the polyfunctional monomer is at least one member selected from the group consisting of ethylene glycol dimethacrylate, 1,3-adamantane dimethacrylate, divinylbenzene and trimethylolpropane triacrylate.

10. The medium according to any one of the above 1 to 5, which has hydrophilic groups on the surface of particles.

11. The medium according to the above 10, which is obtained by reacting a hydrophilizing agent with the medium as defined in any one of the above 1 to 5.

12. The medium according to the above 10 or 11, wherein when pullulan is used as a standard substance and pure water is used as an eluent, the molecular weight exclusion limit is from 500,000 to 2,000,000.

13. The medium according to any one of the above 1 to 5 and 10 to 12, which has ion exchange groups on the surface of particles.

14. The medium according to the above 13, having ion exchange groups introduced by subjecting the epoxy groups contained in the crosslinked polymer particles consisting the medium as defined in any one of the above 1 to 5 to ring opening.

15. The medium according to the above 13, having ion exchange groups introduced by epoxidizing the crosslinked polymer particles consisting the medium as defined in any one of the above 10 to 12, and subjecting the epoxy groups to ring opening.

16. The medium according to any one of the above 13 to 15, wherein the ion exchange groups are at least one member selected from the group consisting of sulfonic acid groups, carboxyl groups, primary amino groups, secondary amino groups, tertiary amino groups and quaternary ammonium groups.

17. A method of separating proteins, which uses the medium as defined in any one of the above 13 to 16 as a medium for chromatography.

Effects of the Invention

The medium of the present invention is hard and has high mechanical strength and is thereby capable of being used at high speed, and has high chemical stability against a high concentration aqueous alkaline solution.

Further, by introducing a substituent at the reaction site of the medium of the present invention, a medium excellent in hydrophilicity and a medium having ion exchange groups can easily be prepared, such being suitable for separation and purification of proteins.

BEST MODE FOR CARRYING OUT THE INVENTION

Now, a medium (hereinafter referred to as a medium (1)) comprising crosslinked polymer particles containing from 20 to 95 mol % of repeating units derived from a (meth)acryloyl monomer represented by the above formula (1) will be described.

In the present invention, the medium (1) is not particularly limited, and a medium comprising crosslinked polymer particles containing from 20 to 95 mol % of repeating units derived from a (meth)acryloyl monomer represented by the above formula (1) and from 80 to 5 mol % of repeating units derived from a polyfunctional monomer may be mentioned as a preferred example. More specifically, a medium comprising crosslinked polymer particles containing from 20 to 95 mol % of repeating units represented by the above formula (2) and from 80 to 5 mol % of repeating units represented by the above formula (3) may be mentioned as a preferred example.

In the present invention, the process for producing the medium (1) is not particularly limited. For example, it can be produced by suspending a monomer mixture containing from 20 to 95 mol % of the (meth)acryloyl monomer represented by the above formula (1) and a crosslinking agent, and a suspension stabilizer, in an aqueous phase, followed by polymerization. More specifically, it can be produced by suspending a monomer mixture containing from 20 to 95 mol % of the (meth)acryloyl monomer represented by the above formula (1) and from 80 to 5 mol % of a polyfunctional monomer used as a crosslinking agent, and a suspension stabilizer, in an aqueous phase, followed by polymerization.

A common process for producing the medium (1) using the (meth)acryloyl monomer represented by the above formula (1) will be described below, but the production process is not limited thereto. First, as a continuous phase, for example, a predetermined surfactant and if necessary, an inorganic salt are added to distilled water and well stirred to dissolve them to prepare an aqueous solution. Then, the aqueous solution is heated to a predetermined temperature. Then, the (meth)acryloyl monomer of the present invention, the polyfunctional monomer to be used as a crosslinking agent, a polymerization initiator and if necessary, another monomer, an organic solvent to be added for the purpose of adjusting pores, and the like are respectively weighed in predetermined amounts to prepare an adjusted mixed liquid. The adjusted mixed liquid is added dropwise to the aqueous solution containing the surfactant with stirring to carry out formation of droplets and at the same time, polymerization is carried out at a predetermined temperature to produce polymer particles. The polymerization temperature is not particularly limited so long as it is a temperature at which the polymerization initiator is decomposed to generate radicals. Usually, polymerization is carried out preferably at from 20° C. to 80° C., more preferably at from 40° C. to 70° C.

The (meth)acryloyl monomer to be used for the medium (1) of the present invention is not particularly limited so long as it is a (meth)acryloyl monomer corresponding to the formula (1) and having a reaction site to introduce a substituent after formation of crosslinked polymer particles. It may, for example, be 4-hydroxybutyl (meth)acrylate glycidyl ether, 6-chlorohexyl (meth)acrylate, 4-bromobutyl (meth)acrylate, 4-hydroxybutyl (meth)acrylate, hydroxypentyl (meth)acrylate, 6-aminohexyl (meth)acrylamide, 3,4-epoxycyclohexylmethyl (meth)acrylate, 3,4-dihydroxycyclohexylmethyl (meth)acrylate or a compound having a part of or the entire dihydroxy group of such a compound substituted by a glycidyl group; 3,4-epoxycyclohexylethyl (meth)acrylate, 3,4-dihydroxycyclohexylethyl (meth)acrylate or a compound having a part of or the entire dihydroxy group of such a compound substituted by a glycidyl group; 3,4-epoxycyclohexylpropyl (meth)acrylate, 3,4-dihydroxycyclohexylpropyl (meth)acrylate or a compound having a part of or the entire dihydroxy group of such a compound substituted by a glycidyl group; a reaction product of a (meth)acryl halide with one of amino groups in 2,5-bis(aminomethyl)bicyclo[2,2,1]heptane; a reaction product of a (meth)acryl halide with one of hydroxyl groups in 2,5-bis(hydroxymethyl)bicyclo[2,2,1]heptane; a reaction product of a (meth)acryl halide with one of amino groups in 2,6-bis(aminomethyl)bicyclo[2,2,1]heptane; a reaction product of a (meth)acryl halide with one of hydroxyl groups in 2,6-bis(hydroxymethyl)bicyclo[2,2,1]heptane; a reaction product of a (meth)acryl halide with one of hydroxy groups in 1,3-dihydroxyadamantane; or a reaction product of a (meth)acryl halide with one of amino groups in 1,3-diaminoadamantane. Further, the above (meth)acryloyl monomers may be used alone or as a mixture.

In the medium (1) of the present invention, the proportion of the (meth)acryloyl monomer represented by the above formula (1) is usually within a range of at least 20 mol % and at most 95 mol %, preferably at least 30 mol % and at most 93 mol % in all the monomers. The reason why such a proportion is preferred is that if the proportion of the (meth)acryloyl monomer is less than 20 mol %, there are such problems. (a) Stability against an alkali will be low, (b) the number of reaction sites to introduce substituents in formed particles tends to reduce, whereby no hydrophilicity required for separation of proteins or the like will be obtained even when hydrophilicity is imparted by a hydrophilizing agent, (c) if the proportion is higher than 95 mol %, the proportion of a polyfunctional monomer to be copolymerized as a crosslinking agent tends to be too small, whereby the medium tends to be soft, etc.

The polyfunctional monomer to be used for the medium (1) of the present invention is not particularly limited. It may, for example, be divinylbenzene; an alkylene glycol di(meth)acrylate with a number of repeating units of a $C_{1-4}$ alkylene glycol of from 1 to 5; an alkylene ($C_{1-11}$) bis(meth)acrylate; or an alkylene ($C_{1-11}$) (bis)acrylamide. The polyfunctional monomer is not limited thereto so long as it is copolymerizable with the (meth)acryloyl monomer represented by the above formula (1). Further, a bifunctional compound formed as a by-product when the (meth)acryloyl monomer of the present invention is prepared may be used as the polyfunctional monomer to be copolymerized as the crosslinking agent. Specific examples of the polyfunctional monomer include divinylbenzene, divinyltoluene, divinylxylene, 1,3-adamantane dimethacrylate, ethylene glycol di(meth)acrylate, diethylene glycol di(meth)acrylate, triethylene glycol di(meth)acrylate, polyethylene glycol di(meth)acrylate, glycerol di(meth)acrylate, trimethylolpropane tri(meth)acrylate and ethylenebisacrylamide.

In the medium (1) of the present invention, the proportion of the polyfunctional monomer is not particularly limited, but is usually within a range of at least 5 mol % and at most 80 mol %, preferably at least 7 mol % and at most 70 mol % in all the monomers. The reason why such a proportion is preferred is that if the proportion of the polyfunctional monomer is less than 5 mol %, no sufficient hardness of the medium will be obtained, and the medium may be collapsed under high pressure. Further, if the proportion of the crosslinking agent is at least 80 mol %, the number of reaction sites to introduce substituents in formed particles tends to decrease, whereby no hydrophilicity required for separation of proteins or the like will be obtained even if hydrophilicity is imparted by a hydrophilizing agent. Further, the stability against an alkali tends to be low and in addition, the medium is fragile in some cases, whereby fine particles may be formed when the medium is packed in a column or when it is stirred.

For the medium (1) of the present invention, in addition to the (meth)acryloyl monomer represented by the above formula (1) and the above-described polyfunctional monomer, another monomer may be used within a range not to depart from the scope of the present invention. Such another monomer may, for example, be a (meth)acrylate compound such as hydroxyethyl (meth)acrylate, hydroxypropyl (meth)acrylate, glycidyl (meth)acrylate or a $C_{1-3}$ linear or branched alkyl (meth)acrylate; a polymcrizable (meth)acrylamide compound such as hydroxyethyl (meth)acrylamide, hydroxypropyl (meth)acrylamide, hydroxybutyl (meth)acrylamide or a $C_{1-3}$ linear or branched alkyl (meth)acrylamide; a polymerizable aryl compound such as an arylamine, arylchloride or an aryl glycidyl ether; or a polymerizable vinyl compound such as a haloalkyl ($C_{1-4}$) vinyl ether, a hydroxyalkyl ($C_{1-4}$) vinyl ether or vinyl acetate. Such another monomer used in combination is not particularly limited so long as functions of the present invention are satisfied. Further, such another monomer used in combination may be used alone or as mixed.

The polymerization initiator used in production of the medium (1) of the present invention may, for example, be an organic peroxide or an azo compound used in usual suspension polymerization. As the organic peroxide, a butylperoxide type may, for example, be t-butyl peroxyneodecanoate, t-butyl peroxy 2-ethylhexanoate, t-butyl peroxyisobutyrate, 2,5-dimethyl-2,5-di(benzoylperoxy)hexane, t-butyl peroxyacetate or t-butyl peroxybenzoate. An amyl peroxide type may, for example, be t-amyl peroxy 2-ethylhexanoate, t-amyl peroxy n-octoate, t-amyl peroxyacetate or t-amyl peroxybenzoate. A peroxycarbonate type may, for example, be t-butyl peroxyisopropylcarbonate, t-butyl peroxy 2-ethylhexylcarbonate, t-amyl peroxy 2-ethylhexylcarbonate, di(2-ethylhexyl)peroxydicarbonate or di(sec-butyl)peroxydicarbonate. A dialkyl peroxide type may, fore example, be dicumyl peroxide, 2,5-dimethyl 2,5-di(t-butylperoxy)hexane, di-t-butyl peroxide or di-t-amyl peroxide. Further, a peroxyketal type may, for example, be 1,1-di(t-butylperoxy)cyclohexane, 2,2-di(t-butylperoxy)butane, ethyl-3,3-di(t-butylperoxy)butyrate or 1,1-di(t-amylperoxy)cyclohexane.

Further, as the azo compound, an azonitrile type may, for example, be 2,2'-azobis(4-methoxy-2,4-dimethylvaleronitrile), 2,2'-azobis(2,4-dimethylvaleronitrile), 2,2'-azobis(2-methylpropionitrile), 2,2'-azobis(2-methylbutyronitrile) or 1,1'-azobis(cyclohexane-1-carbonitrile). An azoamide type may, for example, be 2,2'-azobis[N-(2-propenyl)-2-methylpropionamide], 2,2'-azobis[N-butyl-2-methylpropionamide] or 2,2'-azobis[N-cyclohexyl-2-methylpropionamide]. Further, another azo compound may, for example, be 2,2'-azobis(2-methylpropionamidoxime), dimethyl 2,2'-azobis(2-methylpropionate), 4,4'-azobis(4-cyanovaleric acid) or 2,2'-azobis (2,4,4-trimethylpentane). However, the polymerization initiator is not particularly limited to the above compounds so long as it can polymerize the (meth)acryloyl monomer. If the addition amount of such a polymerization initiator is too small, the rate of polymerization tends to be low, and monomers may remain in a large amount in some cases. Further, if it is too large, the polymerization initiator may remain in the polymer particles, thus impairing separation by adsorption of proteins or the like. Accordingly, the polymerization initiator is used in an amount of from 0.05 wt % to 20 wt %, preferably from 0.2 wt % to 10 wt % based on all the monomers.

In the present invention, the suspension stabilizer to be used for suspension polymerization is not particularly limited so long as it is a surfactant soluble in a continuous phase. It may, for example, be an anionic surfactant, a cationic surfactant or a nonionic surfactant, and any of them can be used. Further, the molecular weight of the suspension stabilizer is not particularly limited, and either a low molecular compound or a polymer compound may be used. Specifically, the anionic surfactant may, for example, be a fatty acid salt, a sulfate of a higher alcohol, a phosphate of a fatty alcohol, an alkyl allyl sulfonate or naphthalene sulfonate formaldehyde condensate. The cationic surfactant may, for example, be an alkyl primary amine salt, an alkyl secondary amine salt, an alkyl tertiary amine salt, an alkyl quaternary ammonium salt or a pyridinium salt. The nonionic surfactant may, for example, be a polyoxyethylene alkyl ether, a polyoxyethylene alkyl phenyl ether, a polyoxyethylene alkyl ester, a sorbitan alkyl ester or a polyoxyethylene sorbitan alkyl ester. Further, a polymer surfactant may, for example, be a partially saponified polyvinyl alcohol, starch, methyl cellulose, carboxymethyl cellulose, hydroxyethyl cellulose or partially saponified polymethacrylate. In the present invention, in addition to such a surfactant, as the case requires, an inorganic salt such as barium sulfate, calcium sulfate, aluminum sulfate, calcium carbonate or talc may further be added. The addition amount of the suspension stabilizer is not particularly limited but is usually within a range of from 0.01 wt % to 30 wt %, preferably from 0.1 wt % to 15 wt % based on the continuous phase.

Here, as a medium for chromatography, a porous medium with a relatively large adsorption load amount and a nonporous medium used for the purpose of developing high separative power by suppressing broadening of the separating band by diffusion of solute molecules in pores, have been known.

The medium of the present invention is not particularly limited, and it can be produced into both porous and non-porous media depending upon the production process.

In the case of a porous medium, it is required to adjust the pore size. One example of the adjustment will be described below, but the present invention is by no means restricted to the following method. Here, an organic solvent to be added for the purpose of adjusting the pore size can not generally be determined since it is influenced by e.g. the amount and the type of the (meth)acryloyl monomer to be used in the present invention, its ratio to the polyfunctional monomer and another monomer, the type and the amount of the polyfunctional monomer, the type and the amount of the polymerization initiator, and the polymerization temperature. In general, polymer particles with a small pore size can be produced by use of an organic solvent with high swelling properties over formed polymer particles, and polymer particles with a large pore size can be produced by use of a poor solvent in which monomers are soluble but a polymer is insoluble.

The organic solvent to be added for the purpose of adjusting the pore size may, for example, be an aromatic hydrocarbon such as toluene, xylene, diethylbenzene or dodecylbenzene; a saturated hydrocarbon such as hexane, heptane or decane; or an alcohol such as isoamyl alcohol, hexyl alcohol or octyl alcohol. The organic solvent is not particularly limited so long as it is an organic solvent which is insoluble in water and in which the monomers and the polymerization initiator used are soluble. The addition amount of the organic solvent added for the purpose of adjusting the pore size has influences over the porosity (representing the ratio of the pore volume to the total volume of the medium particles) of the medium. The porosity can not generally be determined since it varies depending upon the purpose of use of the medium. Usually, a medium having a porosity of from 40% to 90%, preferably about from 55% to 80% is used. If the porosity is out of this range, such a purpose that a larger amount of water-soluble compounds such as proteins are adsorbed in the medium will not be achieved, such being undesirable in view of function. The porosity is determined usually by the ratio of the organic solvent added to all the monomers, and the porosity tends to be high when the organic solvent is used in a large amount, and the porosity tends to be low when the amount of the organic solvent used is small. However, adjustment of the porosity is not limited to the above method since the porosity can be changed by changing the reactivity of monomers, or by coating surface of polymer particles having a high porosity with another compound.

On the other hand, in production of a non-porous medium, no organic solvent for adjustment of the pore size is added, and the medium is produced by using, as an adjusted mixed liquid, the (meth)acryloyl monomer, the polyfunctional monomer and the polymerization initiator. Further, the proportion of the polyfunctional monomer is suitably within a range of at least 10 mol % and at most 80 mol % in order that the pore volume is small and the pore size is small.

The average particle size of the medium (1) of the present invention can not generally be determined since it is set depending upon the purpose of use and the amount of purification of proteins. For example, in the case of a porous medium, it is usually within a range of from 3 µm to 500 µm, preferably from 5 µm to 300 µm. On the other hand, in the case of a non-porous medium, it is usually within a range of from 1.5 µm to 60 µm, preferably from 2 µm to 30 µm. If the particle size is too small, the pressure loss in the column filled with the medium tends to be great when proteins or the like are separated and purified at high speed, whereby it is required to use a pressure resistant reactor, and an enormous cost will be required for equipment. Further, if the particle size is too large, it will take long until proteins in the aqueous solution reach the particle surface, thus creating a problem of diffusion that the moving rate of proteins to the particles tends to decrease. Accordingly, the above range is suitable.

The crosslinked polymer particles thus produced contain contaminants such as the organic solvent added for the purpose of adjusting the pore size and a very small amount of remaining monomers. Thus, it is common to wash particles with a water-soluble organic solvent such as acetone or tetrahydrofuran to remove the contaminants, and then to carry out hydrophilizing reaction or to introduce substituents such as ion exchange groups.

Now, the medium characterized in that hydrophilic groups are present on the surface of particles of the above-described medium (1) of the present invention (hereinafter referred to as a medium (2)) will be described.

The crosslinked polymer particles to be used for the medium (1) of the present invention have halogen atoms, alcoholic OH groups, amino groups, glycidyl groups or epoxy groups as the reaction sites for introduction of a substituent. Thus, it is possible to easily impart hydrophilicity to the crosslinked polymer particles by reacting a hydrophilizing agent. The hydrophilizing agent used is not particularly limited so long as it contains two or more active hydrogen groups. It may, for example, be water; a glycol having a number of repeating units of oxyethylene groups of at most 20, more preferably at most 10, represented by ethylene glycol, diethylene glycol, triethylene glycol or the like; or a polyol represented by glycerol, sorbitol or the like. In addition, e.g. a hydrolyzate of a polyfunctional epoxy compound may be used as the polyol.

Further, it is possible to use, as the hydrophilizing agent, a compound which is hydrophobic before the reaction but shows hydrophilicity after the reaction. For example, a sorbitol polyglycidyl ether, a sorbitan polyglycidyl ether, a pentaerythritol polyglycidyl ether, a glycerol polyglycidyl ether or a neopentyl glycol diglycidyl ether may be mentioned. Such a hydrophilizing agent is reacted with the crosslinked polymer particles and if necessary, the above compound containing two or more active hydrogen groups may further be reacted with the remaining epoxy group. Any of the above dihydroxy compounds, polyhydroxy compounds and compounds showing hydrophilicity after the reaction, which are water-soluble, can be used as the hydrophilizing agent.

In the present invention, the crosslinked polymer particles obtained by polymerizing the (meth)acryloyl monomer of the above formula (1), followed by washing with a water-soluble organic solvent, contains halogen atoms, alcoholic OH groups, amino groups, glycidyl groups, epoxy groups or the like as the reaction sites, as described above. Now, regarding the respective reaction sites, a hydrophilizing method will be described.

In a case where the reaction site is a halogen atom, a method of converting the halogen group to an OH group by hydrolysis in the presence of an alkali catalyst in an aqueous solution, or a method of fixing a compound containing two or more OH groups in the presence of an alkali catalyst utilizing so-called Williamson synthesis, may, for example, be mentioned.

In a case where the reaction site is an alcoholic OH group, a method of carrying out a reaction with the above epoxy compound in the presence of an alkali catalyst, and if necessary, further carrying out a reaction of the remaining epoxy group with a polyhydric alcohol, may be mentioned. Otherwise, a method of epoxidizing the alcoholic OH group using epichlorohydrin and fixing a compound containing two or more OH groups, may be mentioned.

In a case where the reaction site is an amino group, a method of carrying out a reaction with the above epoxy compound, and if necessary, further carrying out a reaction of the remaining epoxy group with a polyhydric alcohol, or a method of epoxidizing the amino group using epichlorohydrin and fixing a compound containing two or more OH groups, may be mentioned.

In a case where the reaction site is a glycidyl group or an epoxy group, a method of fixing a compound containing two or more OH groups in the presence of an acid or alkali catalyst may be mentioned.

The molecular weight exclusion limit of the medium (2) of the present invention thus obtained is preferably within a range of from 500,000 to 2,000,000 when pullulan is used as a standard substance and pure water is used as an eluent.

The medium (2) of the present invention is used, for example, as a hydrophilic substrate for chromatography.

With respect to a hydrophilic substrate for chromatography for the purpose of separating and purifying biopolymers, it is generally preferred that the biopolymers are eluted without any interaction with the medium when elution is carried out with a neutral eluent at a salt concentration of about 0.1 mol/L. That is, it is preferred that molecules are eluted in the order of the molecular size with the largest one first and that all molecules are eluted in an elution volume of at most the total amount of the eluent in the column based on the principle of size exclusion chromatography (hereinafter referred to as SEC).

In the present invention, such a hydrophilic substrate preferably satisfies the following physical properties and chemical structure.

The physical properties of the hydrophilic substrate can be substantially specified by pore physical properties, the mechanical strength and the particle size distribution. The pore physical properties can be specified by the pore size distribution and the porosity for the most part. Appropriate pore physical properties depend on the purpose and the method of separation and the molecular size of the polymer to be separated. For example, in a case where the polymer to be separated is common globular proteins and the substrate is a substrate for desalting or a substrate for a non-porous medium, the pore size is preferably at most 5,000 (as calculated as molecular weight of pullulan) by the molecular weight exclusion limit, and the porosity is preferably as high as possible and is properly from 60 to 95% for desalting. On the other hand, in the case of the substrate for a non-porous medium, the porosity is preferably as low as possible in order to improve the mechanical strength and is properly at most 20%. For SEC separation of proteins, the pore size is preferably from 5,000 to 500,000 (as calculated as molecular weight of pullulan) by the molecular weight exclusion limit. Further, in order to fix ion exchange groups, hydrophobic groups or ligands for affinity to the substrate, the molecular weight exclusion limit is preferably from 10,000 to 5,000,000 (as calculated as molecular weight of pullulan) and the porosity is preferably from 50 to 95%. In the case of the substrate for a porous medium, the separative performance per volume improves when the porosity is large and the particle size is small regardless of the separation method. If the porosity is high, the medium tends to have weak mechanical strength and is likely to be deformed when an eluent is made to flow through it, and accordingly the porosity is preferably is at most 95%. Particularly in the case of a substrate for a medium for high performance liquid chromatography for analytical purpose, the porosity is preferably at most 80%. If the particle size is reduced, the pressure loss per column height of a packed column tends to increase, and it is necessary to further increase the mechanical strength. Accordingly, in order that the eluent flows at an appropriate flow rate, the medium is required to have high mechanical strength, and the porosity and the particle size must be adjusted so as not to increase the pressure loss more than necessary. Further, if the medium is not spherical, when it is packed in the column, the medium may form bridges and have gaps and thereby can not be packed in a closest packed state. Accordingly, practically, the elution peak shape may be asymmetric, the peak width tends to broaden, and a column with low performance will be obtained. Accordingly, the medium is preferably spherical.

Further, as the chemical structure of the hydrophilic substrate, a functional group which is easily modified is required as a site for preparation of various media. An alcoholic hydroxyl group is preferably present on the surface for fixation without interfering the characteristic interaction between the solute and the functional group. That is, a large number of alcoholic hydroxyl groups and polar functional groups which will not be ionized are preferably present in the interior of the pores and on the outer surface. It is preferred that there are no functional groups which inhibit characteristic interaction between the aimed solute and the functional group to be introduced, or the amount of such functional groups is within such a range that the functional groups can be masked by simple modification. That is, it is preferred that the amount of ionic groups and hydrophobic groups is as small as possible.

Now, the medium characterized in that ion exchange groups are present on the surface of particles of the medium (1) or the medium (2) of the present invention (hereinafter referred to as a medium (3)) will be described.

The ion exchange groups which the medium (3) of the present invention has are not particularly limited, and they may, for example, be preferably sulfonic acid groups, carboxyl groups, amino groups or quaternary ammonium groups.

In the present invention, the method of introducing ion exchange groups to the medium (1) or (2) is not particularly limited. For example, in a case where polymer particles obtained by polymerization using the (meth)acryloyl monomer of the above formula (1), followed by washing with a water-soluble organic solvent, has glycidyl groups or epoxy groups as reaction sites, the polymer particles may be converted to a cation exchange resin by subjecting the epoxy groups to ring opening by use of sodium sulfite or acidic sodium sulfite to introduce sulfonic acid groups. Further, the polymer particles may be converted to an anion exchange resin by subjecting the epoxy groups to ring opening by using a primary, secondary or tertiary amino group instead of a sodium sulfite to introduce amino groups.

Further, the medium (3) of the present invention is prepared by using hydrophilized crosslinked polymer particles to be used as the medium (2), epoxidizing them by epichlorohydrin and then introducing a sodium sulfite or an amine. The amine used here is not particularly limited. It may, for example, be ammonia, a $C_{1-4}$ alkylamine, a $C_{1-4}$ dialkylamine, a $C_{1-4}$ trialkylamine, a hydroxyalkyl ($C_{1-4}$) amine, dihydroxyalkyl ($C_{1-4}$) amine, a trihydroxyalkyl ($C_{1-4}$) amine, N-hydroxyethylpiperazine, N-aminoethylpiperazine, morpholine, ethylenediamine or diethylenetriamine.

In a case where the reaction sites are halogen atoms, an anion exchange resin can be obtained by reaction using the above amine. Further, in a case where the reaction sites are amino groups, the crosslinked polymer particles can be used as an anion exchange resin as they are. Further, if necessary, epichlorohydrin may be reacted and further amino groups are introduced.

In a case where the reaction sites are alcoholic OH groups, a cation exchange resin can be obtained by reaction using bromoethylsulfonic acid, monochloroacetic acid, 1,3-propane sultone or the like. Further, an anion exchange resin is obtained by reaction using 2-chloroethyldiethylamine hydrochloride, glycidyl trimethylammonium chloride or the like. Further, epoxy groups can be introduced by reaction using an epihalohydrin.

The medium (3) of the present invention thus obtained is used, for example, as a medium for chromatography, when biopolymers such as proteins are separated and purified.

The medium for ion exchange chromatography for the purpose of separating and purifying biopolymers is a medium having, to the substrate as described regarding the hydrophilic substrate, the same type of cation exchange groups or anion exchange groups fixed. Physical properties of such a medium depend on the substrate for the most part. However, by introduction of ion exchange groups, the osmotic pressure changes as between the interior and the outside of the particles when the salt concentration of the eluent is changed. By this action, the medium swells at a low salt concentration and shrinks at a high salt concentration. For ion exchange chromatography of proteins, a method of gradually increasing the salt concentration so that proteins are eluted from proteins with low interaction, is used in many cases. In such a case, with a medium having a high swelling/shrinkage ratio, the column bed volume greatly changes, the state of the medium changes at every use, and no separation with good reproducibility can be conducted. The degree of the swelling/shrinkage ratio is determined by the strength (hardness) of the substrate matrix (skeleton) and the ion exchange capacity. In general, the larger the ion exchange capacity, the more influential. Accordingly, it is preferred that the substrate matrix hardly swell or shrink and that the ion exchange capacity is not large more than necessary. Specifically, the ion exchange capacity is properly within a range of from 30 to 300 meq/l. Further, in the case of other biopolymers, e.g. in the case of nucleic acids (DNA, RNA), it is preferably at most 200 meq/l, and in the case of peptides and oligosaccharides, it is preferably from 50 to 500 meq/l.

The elution method in ion exchange chromatography, may, for example, be the above-described elution method by gradually increasing the salt concentration, a method of gradually changing the pH of an eluent from the pH at which the aimed solute is bonded to ion exchange groups to the pH at which the solute is released from ion exchange groups, and a combination thereof.

Further, an alkaline solution is used for regeneration, washing, etc., and accordingly preferred is a medium of which the substrate matrix hardly swell or shrink.

EXAMPLES

Now, the medium of the present invention and its production process will be described in further detail with reference to Examples. However, the present invention is by no means restricted thereto.

Preparation Example 1

First, 1.5 g of a polyvinyl alcohol (suspension stabilizer) having a saponification ratio of 88% and a degree of polymerization of 3,500 and 1 L of water were charged in a reactor equipped with a stirrer and stirred well to dissolve the polyvinyl alcohol in water. Then, the aqueous solution was adjusted at 60° C., which was regarded as an adjusted aqueous solution.

Then, an adjusted mixed liquid comprising 45 g of glycidyl methacrylate, 15 g of ethylene glycol dimethacrylate, 65 g of chlorobenzene and 0.3 g of azobisisobutyronitrile was prepared, which was added dropwise to the above adjusted aqueous solution at 60° C. with stirring. Subsequently, the suspended product was subjected to polymerization at 60° C. for 6 hours with stirring. Then, the reactor was cooled to room temperature, and the product was collected by filtration and washed with warm water several times and then washed with dioxane to obtain a particulate gel (crosslinked polymer particles).

(Preparation of Hydrophilic Substrate)

The obtained particulate gel was further washed with water well, and 20 g of the polymer was well mixed with 200 mL of a 0.5N sulfuric acid aqueous solution, and the mixture was heated to 90° C. in a water bath to carry out reaction for 5 hours to hydrolyze epoxy groups. Then, the product was washed with water well and subjected to classification with sieving in a water bath to obtain a particulate gel having particle sizes of from 40 μm to 90 μm. This gel will be referred to as hydrophilic substrate 1.

(Measurement of Moisture Content)

The moisture content of hydrophilic substrate 1 was determined by Kett moisture meter from the weight reduction of hydrophilic substrate 1 after heated at 120° C. for 15 minutes and as a result, the moisture content was 57.2%.

(Quantitative Analysis of Epoxy Groups)

About 2 g of hydrophilic substrate 1 was charged in a stoppered Erlenmeyer flask having a capacity of 200 mL and weighed. Then, to the flask, accurately 25 mL of an about 0.2M hydrochloric acid/dioxane solution was added, and a stirrer was put, followed by moderate stirring at room temperature for 3 hours. Then, to the flask, 50 mL of ethyl alcohol and 1 mL of a phenol phthalein solution were added, followed by titration with a 0.1M NaOH solution to determine the amount of remaining hydrochloric acid. Further, simultaneously, the hydrochloric acid concentration in the about 0.2M hydrochloric acid/dioxane solution was determined by titration with a 0.1M NaOH solution. Further, about 2 g of hydrophilic substrate 1 was charged into a stoppered Erlenmeyer flask having a capacity of 200 mL and weighed, 75 mL of ethyl alcohol was added, followed by stirring at room temperature for about 30 minutes, and titration with a 0.1M NaOH solution using a phenol phthalein solution as an indicator was carried out to determine the acid value in the measured gel.

The epoxy amount per 1 g of the dry gel was determined from the amount of remaining hydrochloric acid, the acid value and the moisture content of the gel thus obtained. The epoxy amount of the hydrophilic substrate was at most 0.3 mmol per 1 g of the dry gel.

(Measurement of Molecular Weight Exclusion Limit and Porosity)

A stainless steel column having an inner diameter of 10.7 mm and a length of 150 mm was filled with a medium comprising hydrophilic substrate 1 by slurry packing method in the closest packed state. Then, this column was attached to HLC-803D (manufactured by TOSOH CORPORATION) equipped with an RI-8000 detector (manufactured by TOSOH CORPORATION). Then, using dextran having a molecular weight of 40,000,000 and pullulans having various molecular weights as standard substances, standard substances having various molecular weights were injected at a flow rate of 0.5 mL/min, and the molecular weight exclusion limit was determined from the eluted volumes. Further, the porosity was determined from the eluted volumes of dextran and ethylene glycol and the column capacity. Particles of hydrophilic substrate 1 had a molecular weight exclusion limit of 1,000,000 and a porosity of 62%.

(Preparation of Aminated Medium)

The obtained hydrophilic substrate 1 was washed with pure water and subjected to suction filtration, 50 mL of hydrophilic substrate 1 was put in a 300 mL separable flask, and 20 mL of pure water and 20 mL of a 35% sodium hydroxide aqueous solution were added, followed by stirring and mixing. Then, while the reaction temperature was maintained at from 35 to 40° C., 33 g of epichlorohydrin and 39 g of diethylaminoethanol were added dropwise over a period of 4 hours, and then reaction was continued at 40° C. further for 5 hours. After completion of the reaction, the reaction liquid was subjected to suction filtration, and washed well with pure water, with 0.5N hydrochloric acid and with pure water again in this order. The medium obtained by the above reaction will be referred to as aminated medium 1.

Preparation Example 2

In the same manner as in Example 1 except that an adjusted mixed liquid comprising 49 g of glycidyl methacrylate, 11 g of ethylene glycol dimethacrylate, 65 g of chlorobenzene and 0.3 g of azobisisobutyronitrile was used, the adjusted mixed liquid was added dropwise to the adjusted aqueous solution adjusted at 60° C. with stirring. Subsequently, the suspended product was subjected to polymerization at 60° C. for 6 hours with stirring. Then, the reactor was cooled to room temperature, and the product was collected by filtration, washed with warm water several times and washed with dioxane to obtain a particulate gel (crosslinked polymer particles).

25 g of the particulate gel, 200 g of polyethylene glycol (average molecular weight: 200) and 100 g of dioxane were mixed well, 1 mL of borontrifluoride ethyl ether complex was added, the mixture was heated at 85° C. with stirring, and heating was continued for 4 hours. Then, the reaction product was cooled to room temperature, washed well with water and subjected to classification with sieving in a water bath to obtain a particulate gel having particle sizes of from 40 µm to 90 µm. This gel will be referred to as hydrophilic substrate 2.

Physical properties of hydrophilic substrate 2 were measured in accordance with the methods disclosed in Preparation Example 1. As a result, the moisture content was 55.9%, the remaining epoxy amount was at most 0.3 mmol per 1 g of the dry substrate, the molecular weight exclusion limit was 1,100,000, and the porosity was 63.2%.

Further, amino groups were introduced to hydrophilic substrate 2 in accordance with the method disclosed in Preparation Example 1. The medium obtained by this reaction will be referred to as aminated medium 2.

Preparation Example 3

In the same manner as in Example 1 except that an adjusted mixed liquid comprising 56 g of glycidyl methacrylate, 4 g of ethylene glycol dimethacrylate, 65 g of chlorobenzene and 0.3 g of azobisisobutyronitrile was used, the adjusted mixed liquid was added dropwise to the adjusted aqueous solution adjusted at 60° C. with stirring. Subsequently, the suspended product was subjected to polymerization at 60° C. for 6 hours with stirring. Then, the reactor was cooled to room temperature, and the product was collected by filtration, washed with warm water several times and washed with dioxane to obtain a particulate gel (crosslinked polymer particles).

25 g of the particulate gel, 200 g of polyethylene glycol (average molecular weight: 200) and 100 g of dioxane were mixed well, 1 mL of borontrifluoride ethyl ether complex was added, the mixture was heated at 85° C. with stirring, and heating was continued for 4 hours. Then, the reaction product was cooled to room temperature, washed well with water and subjected to classification with sieving in a water bath to obtain a particulate gel having particle sizes of from 40 µm to 90 µm. This gel will be referred to as hydrophilic substrate 3.

Physical properties of hydrophilic substrate 3 were measured in accordance with the methods disclosed in Preparation Example 1. As a result, the moisture content was 69.4%, the remaining epoxy amount was at most 0.3 mmol per 1 g of the dry substrate, the molecular weight exclusion limit was 1,650,000, and the porosity was 69.4%.

Further, amino groups were introduced to hydrophilic substrate 3 in accordance with the method disclosed in Preparation Example 1. The medium obtained by this reaction will be referred to as aminated medium 3.

Preparation Example 4

A mixture of 64 g of 3,4-epoxycyclohexylmethyl methacrylate, 16 g of ethylene glycol dimethacrylate, 140 g of butyl acetate, 31 g of chlorobenzene and 1.4 g of t-butyl peroxypivalate was suspended in a solution having 10 g of a polyvinyl alcohol (suspension stabilizer) having a saponification ratio of 88% and a degree of polymerization of 3,500 dissolved in 1 L of water. Subsequently, with stirring, the mixture was heated at 60° C. for 6 hours for polymerization. The reaction liquid was cooled to room temperature, and the formed particulate gel polymer was subjected to filtration with a glass filter. The polymer was washed with warm water several times and washed with 1,4-dioxane to obtain a particulate gel (crosslinked polymer particles).

50 g of the particulate gel, 200 g of polyethylene glycol (average molecular weight: 200) and 200 g of 1,4-dioxane were mixed well, 2 mL of borontrifluoride ethyl ether complex was added, the mixture was heated at 85° C. with stirring, and heating was continued for 4 hours. Then, the reaction product was cooled to room temperature, washed well with water and subjected to classification with sieving to obtain a particulate gel having particle sizes of from 40 µm to 90 µm. This gel will be referred to as hydrophilic substrate 4.

Physical properties of hydrophilic substrate 4 were measured in accordance with the method disclosed in Preparation Example 1. As a result, the moisture content was 68.5%, the remaining epoxy amount was at most 0.3 mmol per 1 g of the dry substrate, the molecular weight exclusion limit was 1,100,000, and the porosity was 74%.

Further, amino groups were introduced to hydrophilic substrate 4 in accordance with the method disclosed in Preparation Example 1. The medium obtained by this reaction will be referred to as aminated medium 4.

Preparation Example 5

A mixture of 58 g of 3,4-epoxycyclohexylmethyl methacrylate, 6 g of glycidyl methacrylate, 16 g of ethylene glycol dimethacrylate, 200 g of chlorobenzene and 0.6 g of azobisisobutyronitrile was suspended in a solution having 15 g of a polyvinyl alcohol (suspension stabilizer) having a saponification ratio of 88% and a degree of polymerization of 2,400 dissolved in 1 L of water. Subsequently, with stirring, the mixture was heated at 60° C. for 6 hours for polymerization. The reaction liquid was cooled to room temperature, and the formed particulate gel polymer was subjected to filtration with a glass filter. To remove the suspension stabilizer attached to the surface of the polymer, the polymer was washed with warm water several times and washed with 1,4-dioxane to obtain a particulate gel (crosslinked polymer particles).

50 g of the particulate gel, 50 g of diethylene glycol, 50 g of polyglycerol polyglycidyl ether (tradename: Denakol EX-521, manufactured by Nagase Chemicals Ltd.) and 200 g of 1,4-dioxane were mixed well, 2 mL of borontrifluoride ethyl ether complex was added, the mixture was heated at 85° C. with stirring, and heating was continued for 4 hours. Then, the reaction product was cooled to room temperature, washed well with water and subjected to classification with sieving to obtain a particulate gel having particle sizes of from 40 µm to 90 µm. This gel will be referred to as hydrophilic substrate 5.

Physical properties of hydrophilic substrate 5 were measured in accordance with the method disclosed in Preparation Example 1. As a result, the moisture content was 70.5%, the remaining epoxy amount was at most 0.3 mmol per 1 g of the dry substrate, the molecular weight exclusion limit was 900,000, and the porosity was 72%.

Further, amino groups were introduced to hydrophilic substrate 5 in accordance with the method disclosed in Preparation Example 1. The medium obtained by this reaction will be referred to as aminated medium 5.

Preparation Example 6

168 g of 3-adamantanediol and 80 g of pyridine were dissolved in 400 g of tetrahydrofuran. While the reaction temperature was maintained at 40° C. with stirring the solution, 84 g of methacrylic acid chloride was added dropwise to the solution, and reaction was carried out for 2 hours. Tetrahydrofuran was distilled off under reduced pressure at 35° C. or below from the obtained reaction liquid, and the residue was subjected to extraction with n-hexane. The n-hexane phase was subjected to extraction with pure water, with a 0.1M phosphoric acid aqueous solution, with a 0.1M sodium carbonate aqueous solution and with pure water in this order to remove unreacted 1,3-adamantanediol, salts, pyridine and methacrylic acid. Finally, the n-hexane phase was subjected to extraction with methanol, and the methanol solution was subjected to distillation under reduced pressure at 35° C. or below.

The obtained product was analyzed by gas chromatography and as a result, the product had a composition comprising 120 g of 3-hydroxyadamantane-1-methacrylate and 4 g of 1,3-adamantane dimethacrylate. Then, a mixture comprising 60 g of the product, 2 g of divinylbenzene, 10 g of trimethylolpropane triacrylate, 50 g of butyl acetate, 100 g of chlorobenzene and 0.6 g of azobisisobutylnitrile was suspended in a solution having 10 g of a polyvinyl alcohol (suspension stabilizer) having a saponification ratio of 88% and a degree of polymerization of 2,400 dissolved in 1 L of water, and the mixture was heated at 60° C. for 6 hours with stirring for polymerization. Then, the reaction product was cooled to room temperature, the formed particulate gel polymer was collected by filtration with a glass filter and washed with warm water several times and then washed with 1,4-dioxane to obtain a particulate gel (crosslinked polymer particles).

50 g of the particulate gel, 20 g of ethylene glycol, 30 g of glycidol and 150 g of 1,4-dioxane were mixed well, 2 mL of borontrifluoride ethyl ether complex was added, the mixture was heated at 85° C. with stirring, and heating was continued for 4 hours. Then, the reaction product was cooled to room temperature, washed well with water and subjected to classification with sieving to obtain a particulate gel having particle sizes of from 40 µm to 90 µm. This gel will be referred to as hydrophilic substrate 6.

Physical properties of hydrophilic substrate 6 were measured in accordance with the methods disclosed in Preparation Example 1. As a result, the moisture content was 67%, the remaining epoxy amount was at most 0.3 mmol per 1 g of the dry substrate, the molecular weight exclusion limit was 600,000, and the porosity was 70%.

Further, amino groups were introduced to hydrophilic substrate 6 in accordance with the method disclosed in Preparation Example 1. The medium obtained by this reaction will be referred to as aminated medium 6.

Preparation Example 7

A mixture comprising 64 g of 1,4-cyclohexanedimethanol monoacrylate (manufactured by Nippon Kasei Chemical Company Limited), 6 g of 4-hydroxybutyl acrylate (manufactured by Nippon Kasei Chemical Company Limited), 18 g of ethylene glycol dimethacrylate, 240 g of chlorobenzene and 1.0 g of t-butyl peroxypivalate was suspended in a solution having 15 g of a polyvinyl alcohol (suspension stabilizer) having a saponification ratio of 88% and a degree of polymerization of 3,500 dissolved in 1 L of water. The mixture was heated at 60° C. for 6 hours with stirring for polymerization. Then, the reaction liquid was cooled to room temperature, and the formed particulate gel polymer was collected by filtration with a glass filter, washed with warm water several times and washed well with acetone and then washed with water to obtain a particulate gel (crosslinked polymer particles).

50 g of the particulate gel, 25 g of polyglycerol polyglycidyl ether (tradename: Denakol EX-521, manufactured by Nagase Chemicals Ltd.) and 80 ml of pure water were mixed well, 30 mL of a 5N sodium hydroxide aqueous solution was added dropwise at 45° C., and the mixture was mixed with stirring for 3 hours. Then, the reaction product was cooled to room temperature, washed well with 0.1N hydrochloric acid and with water and subjected to classification with sieving to obtain a particulate gel having particle sizes of from 40 µm to 90 µm. This gel will be referred to as hydrophilic substrate 7.

Physical properties of hydrophilic substrate 7 were measured in accordance with the method disclosed in Preparation Example 1. As a result, the moisture content was 78%, the remaining epoxy amount was at most 0.3 mmol per 1 g of the dry substrate, the molecular weight exclusion limit was 1,500,000, and the porosity was 75%.

Further, amino groups were introduced to hydrophilic substrate 7 in accordance with the method disclosed in Preparation Example 1. The medium obtained by this reaction will be referred to as aminated medium 7.

Preparation Example 8

50 g of polyvinyl pyrrolidone (suspension stabilizer) having a molecular weight of 360,000 and 1 L of water were charged in a reactor equipped with a stirrer and stirred well to dissolve polyvinyl pyrrolidone in water. Then, the aqueous solution was adjusted at 60° C. Then, a mixed solution comprising 200 g of glycidyl methacrylate, 50 g of ethylene glycol dimethacrylate and 1.0 g of azobisisobutyronitrile was prepared, and the mixed solution was added dropwise to the above aqueous solution at 60° C. with stirring. While nitrogen was made to flow into the above aqueous solution at a flow rate of 10 mL/min, the aqueous solution was vigorously stirred to polymerize the suspended product at 60° C. for 8 hours. The reaction liquid was cooled to room temperature, and the formed gel polymer was collected by filtration, washed with warm water several times and then washed with dioxane to obtain a particulate gel (crosslinked polymer particles).

200 g of the particulate gel (containing dioxane) was dispersed in 300 mL of dioxane, 150 g of ethylene glycol and 5 g of solid sodium hydroxide were added, and the mixture was heated at 70° C. in a water bath and reaction was carried out for 16 hours to conduct ring opening addition reaction of epoxy groups to ethylene glycol. Then, the product was washed well with water and then with acetone. Then, using an acetone slurry solution, classification by decantation was carried out to collect a particulate gel having particle sizes of from 3 to 5 µm. This particulate gel will be referred to as hydrophilic substrate 8.

Further, amino groups were introduced to hydrophilic substrate 8 in accordance with the method disclosed in Preparation Example 1. The medium obtained by this reaction will be referred to as aminated medium 8.

Preparation Example 9

50 g of polyvinyl pyrrolidone (suspension stabilizer) having a molecular weight of 360,000 and 1 L of water were charged in a reactor equipped with a stirrer and stirred well to dissolve polyvinyl pyrrolidone in water. Then, the aqueous solution was adjusted at 60° C. Then, a mixed solution comprising 276 g of 3,4-epoxycyclohexylmethyl methacrylate, 50 g of ethylene glycol dimethacrylate and 1.0 g of azobisisobutyronitrile was prepared, and the mixed solution was added dropwise to the above aqueous solution at 60° C. with stirring. While nitrogen was made to flow into the above aqueous solution at a flow rate of 10 mL/min, the aqueous solution was vigorously stirred to polymerize the suspended product at 60° C. for 8 hours. The reaction liquid was cooled to room temperature, and the formed gel polymer was collected by filtration, washed with warm water several times and then washed with dioxane to obtain a particulate gel (crosslinked polymer particles).

200 g of the particulate gel (containing dioxane) was dispersed in 300 mL of dioxane, and 150 g of ethylene glycol and 1.5 mL of borontrifluoride ether complex were added at room temperature, and the mixture was heated at 70° C. in a water bath and reaction was carried out for 4 hours to conduct ring opening addition reaction of epoxy groups to ethylene glycol. Then, the product was washed well with water and then with acetone, suspended in acetone, and then subjected to classification by decantation to collect a particulate gel having particle sizes of from 3 to 5 µm. This particulate gel will be referred to as hydrophilic substrate 9.

Further, amino groups were introduced to hydrophilic substrate 9 in accordance with the method disclosed in Preparation Example 1. The medium obtained by this reaction will be referred to as aminated medium 9.

Preparation Example 10

A mixture of 48 g of 4-hydroxybutyl acrylate glycidyl ether (manufactured by Nippon Kasei Chemical Company Limited), 16 g of 3,4-epoxycyclohexylmethyl methacrylate, 16 g of ethylene glycol dimethacrylate, 220 g of chlorobenzene and 1.4 g azoisobutyronitrile was suspended in a solution having 10 g of a polyvinyl alcohol (suspension stabilizer) having a saponification ratio of 88% and a degree of polymerization of 2,400 dissolved in 1 L of water. With stirring, the mixture was heated at 65° C. for 6 hours for polymerization. The reaction liquid was cooled to room temperature, and the formed particulate gel polymer was subjected to filtration with a glass filter, washed with warm water several times and washed with 1,4-dioxane to obtain a particulate gel (crosslinked polymer particles).

50 g of the particulate gel, 100 g of diethylene glycol and 200 g of 1,4-dioxane were mixed well, 2 mL of borontrifluoride ethyl ether complex was added, the mixture was heated at 85° C. with stirring, and heating was continued for 4 hours. Then, the reaction product was cooled to room temperature, washed well with water and subjected to classification with sieving to obtain a particulate gel having particle sizes of from 40 µm to 90 µm. This gel will be referred to as hydrophilic substrate 10.

Physical properties of hydrophilic substrate 10 were measured in accordance with the method disclosed in Preparation Example 1. As a result, the moisture content was 72.5%, the remaining epoxy amount was at most 0.3 mmol per 1 g of the dry substrate, the molecular weight exclusion limit was 1,000,000, and the porosity was 76%.

Preparation Example 11

A mixture of 64 g of 4-bromobutyl methacrylate, 16 g of ethylene glycol dimethacrylate, 100 g of 1,2-dichloropropane, 100 g of chlorobenzene and 1.2 g of azobisisobutyronitrile was suspended in a solution having 15 g of a polyvinyl alcohol (suspension stabilizer) having a saponification ratio of 88% and a degree of polymerization of 2,400 dissolved in 1 L of water. With stirring, the mixture was heated at 65° C. for 6 hours for polymerization. The reaction liquid was cooled to room temperature, the formed particulate gel polymer was subjected to filtration with a glass filter, and the polymer was washed with warm water several times to remove the suspension stabilizer attached to the surface, and washed with 1,4-dioxane to obtain a particulate gel (crosslinked polymer particles).

50 g of the particulate gel, 100 g of diethylene glycol and 200 g of 1,4-dioxane were mixed well, 25 g of sodium hydroxide was added, the mixture was heated at 75° C. with stirring, and heating was continued for 10 hours. Then, the reaction product was cooled to room temperature, washed well with water and subjected to classification with sieving to obtain a particulate gel having particle sizes of from 40 µm to 90 µm. This gel will be referred to as hydrophilic substrate 11.

Physical properties of hydrophilic substrate 11 were measured in accordance with the method disclosed in Preparation Example 1. As a result, the moisture content was 70.5%, the remaining epoxy amount was at most 0.3 mmol per 1 g of the dry substrate, the molecular weight exclusion limit was 800,000, and the porosity was 72%.

Preparation Example 12

A mixture comprising 32 g of 1,4-cyclohexanedimethanol monoacrylate (manufactured by Nippon Kasei Chemical Company Limited), 32 g of 6-aminohexyl methacrylamide, 18 g of ethylene glycol dimethacrylate, 100 g of isoamyl alcohol, 100 g of chlorobenzene and 1.5 g of t-butyl peroxypivalate was suspended in a solution having 25 g of polyvinyl pyrrolidone (suspension stabilizer) having a molecular weight of 360,000 and 1 mL of ethanolamine dissolved in 1 L of water. The mixture was heated at 60° C. for 6 hours with stirring for polymerization. The reaction liquid was cooled to room temperature, and the formed particulate gel polymer was collected by filtration with a glass filter, washed with warm water several times, washed well with acetone and then washed with water to obtain a particulate gel (crosslinked polymer particles).

50 g of the particulate gel, 25 g of polyglycerol polyglycidyl ether (tradename: Denakol EX-512, manufactured by Nagase Chemicals Ltd.) and 80 mL of pure water were mixed well and 30 mL of a 5N sodium hydroxide solution was added dropwise at 45° C., followed by stirring and mixing for 3 hours. Then, the reaction product was cooled to room temperature, and washed well with 0.1N hydrochloric acid and water and subjected to classification with sieving to obtain a particulate gel having particle sizes of from 40 µm to 90 µm. This gel will be referred to as hydrophilic substrate 12.

Physical properties of the hydrophilic substrate were measured in accordance with the methods disclosed in Preparation Example 1. As a result, the moisture content was 78%, the molecular weight exclusion limit was 1,200,000, and the porosity was 74%.

Further, amino groups were introduced to hydrophilic substrate 12 in accordance with the method disclosed in Preparation Example 1. The medium obtained by this reaction will be referred to as aminated medium 12.

Preparation Example 13

Hydrophilic substrate 4 obtained in Preparation Example 4 was washed with pure water and subjected to suction filtration, 50 mL of hydrophilic substrate 4 was put in a 300 mL separable flask, and 30 mL of pure water and 20 g of 1,3-propane sultone were added thereto, followed by stirring and mixing. While the reaction temperature was maintained at from 35 to 45° C., 15 g of a 48% sodium hydroxide aqueous solution was added dropwise thereto, and after dropwise addition, reaction was continued at 40° C. further for 3 hours. After completion of the reaction, the reaction liquid was subjected to suction filtration and washed well with pure water. The medium obtained by this reaction will be referred to as sulfonated medium 13.

Preparation Example 14

Hydrophilic substrate 4 obtained in Preparation Example 4 was washed with pure water and subjected to suction filtration, 50 mL thereof was put in a 300 mL separable flask, and 25 mL of pure water and 25 g of sodium monochloroacetate were added thereto, followed by stirring and mixing. While the reaction temperature was maintained at from 45 to 55° C., 60 g of a 48% sodium hydroxide aqueous solution was added dropwise thereto, and after dropwise addition, reaction was continued at 50° C. further for 4 hours. After completion of the reaction, the reaction liquid was subjected to suction filtration and washed well with pure water. The medium obtained by this reaction will be referred to as carboxymethylated medium 14.

Preparation Example 15

Hydrophilic substrate 4 obtained in Preparation Example 4 was washed with pure water and subjected to suction filtration, 50 mL thereof was put in a 300 mL separable flask, and 25 mL of pure water and 40 g of a 70% glycidyl trimethylammonium chloride aqueous solution were added, followed by stirring and mixing. While the reaction temperature was maintained at from 30 to 35° C., 2 g of a 48% sodium hydroxide aqueous solution was charged thereto, and after dropwise addition, the reaction was continued at 35° C. further for 24 hours. After completion of the reaction, the reaction liquid was subjected to suction filtration, and washed well with pure water, with 0.5N hydrochloric acid and then with pure water again in this order. The medium obtained by this reaction will be referred to as quaternary ammoniated medium 15.

Preparation Example 16

Sulfone groups were introduced to hydrophilic substrate 2 obtained in Preparation Example 2 in accordance with the method disclosed in Preparation Example 13. The medium obtained by this reaction will be referred to as sulfonated medium 16.

Preparation Example 17

Carboxymethyl groups were introduced to hydrophilic substrate 2 obtained in Preparation Example 2 in accordance with the method disclosed in Preparation Example 14. The medium obtained by this reaction will be referred to as carboxymethylated medium 17.

Preparation Example 18

Quaternary ammonium groups were introduced to hydrophilic substrate 2 obtained in Preparation Example 2 in accordance with the method disclosed in Preparation Example 15. The medium obtained by this reaction will be referred to as quaternary ammoniated medium 18.

The particulate gels (crosslinked polymer particles), hydrophilic substrates and media prepared in the above Preparation Examples are shown in Tables 1 to 3.

TABLE 1

| Prep. Ex. | Crosslinked polymer particles | |
|---|---|---|
| | Monomer | Crosslinking agent, content |
| 1 | GMA[1] | EGDMA[9], 15 wt % |
| 2 | GMA[1] | EGDMA[9], 18.3 wt % |
| 3 | GMA[1] | EGDMA[9], 6.7 wt % |
| 4 | EHMA[2] | EGDMA[9], 22.9 wt % |
| 5 | EHMA[2]/GMA[1] | EGDMA[9], 20 wt % |
| 6 | HAMA[3] | ADMA[10], DVB[11], MPTA[12], 18.9 wt % |
| 7 | CHMA[4], HBA[5] | EGDMA[9], 20.5 wt % |
| 8 | GMA[1] | EGDMA[9], 20 wt % |
| 9 | EHMA[2] | EGDMA[9], 15.3 wt % |
| 10 | BAGE[6] | EGDMA[9], 20 wt % |
| 11 | Bromobutyl MA[7] | EGDMA[9], 20 wt % |
| 12 | Aminohexylamide[8] + CHMA[4] | EGDMA[9], 22 wt % |

[1]GMA: Glycidyl methacrylate
[2]EHMA: 3,4-Epoxycyclohexylmethyl methacrylate
[3]HAMA: 1,3-Hydroxyadamantane-1-methacrylate
[4]CHMA: 1,4-Cyclohexanedimethanol monoacrylate
[5]HBA: 1,4-Hydroxybutyl acrylate
[6]BAGE: 4-Hydroxybutyl acrylate glycidyl ether
[7]Bromobutyl MA: 4-Bromobutyl methacrylate
[8]Aminohexylamide: 6-Aminohexyl methacrylamide
[9]EGDMA: Ethylene glycol dimethacrylate
[10]ADMA: 1,3-Adamantane dimethacrylate
[11]DVB: Divinylbenzene
[12]MPTA: Trimethylolpropane triacrylate

TABLE 2

| Prep. Ex. No. | ** | Hydrophilizing agent | Catalyst | Particle size | Moisture content | Remaining epoxy amount | Molecular weight exclusion limit | Porosity |
|---|---|---|---|---|---|---|---|---|
| 1 | 1 | H2O | Sulfuric acid | 40 to 90 µm | 57.2% | ≤0.3 mmol/1 g dry gel | 1,000,000 | 62% |
| 2 | 2 | PEG200[1] | BF3 | 40 to 90 µm | 55.9% | ≤0.3 mmol/1 g dry gel | 1,100,000 | 63.2% |
| 3 | 3 | PEG200[1] | BF3 | 40 to 90 µm | 69.4% | ≤0.3 mmol/1 g dry gel | 1,650,000 | 69.4% |

TABLE 2-continued

| Prep. Ex. No. | ** | Hydrophilizing agent | Catalyst | Particle size | Moisture content | Remaining epoxy amount | Molecular weight exclusion limit | Porosity |
|---|---|---|---|---|---|---|---|---|
| 4 | 4 | PEG200[1] | BF3 | 40 to 90 μm | 68.5% | ≤0.3 mmol/ 1 g dry gel | 1,100,000 | 74% |
| 5 | 5 | DEG[2], EX521[3] | BF3 | 40 to 90 μm | 70.5% | ≤0.3 mmol/ 1 g dry gel | 900,000 | 72% |
| 6 | 6 | EG[4], Glyc[5] | BF3 | 40 to 90 μm | 67% | ≤0.3 mmol/ 1 g dry gel | 600,000 | 70% |
| 7 | 7 | EX512[6] | NaOH | 40 to 90 μm | 78% | ≤0.3 mmol/ 1 g dry gel | 1,500,000 | 75% |
| 8 | 8 | EG[4] | NaOH | 3 to 5 μm | — | — | — | — |
| 9 | 9 | EG[4] | BF3 | 3 to 5 μm | — | — | — | — |
| 10 | 10 | DEG[2] | BF3 | 40 to 90 μm | 72.5% | ≤0.3 mmol/ 1 g dry gel | 1,000,000 | 76% |
| 11 | 11 | PEG200[1] | NaOH | 40 to 90 μm | 70.5% | ≤0.3 mmol/ 1 g dry gel | 650,000 | 72% |
| 12 | 12 | EX512[6] | NaOH | 40 to 90 μm | 74% | ≤0.3 mmol/ 1 g dry gel | 660,000 | 74% |

**Hydrophilic substrate No.
[1] PEG200: Polyethylene glycol (average molecular weight: 200)
[2] DEG: Diethylene glycol
[3] EX521: Polyglycerol polyglycidyl ether (tradename: Denakol EX-521, manufactured by Nagase Chemicals Ltd.)
[4] EG: Ethylene glycol
[5] Glyc: Glycidol
[6] EX512: Polyglycerol polyglycidyl ether (tradename: Denakol EX-512, manufactured by Nagase Chemicals Ltd.)

TABLE 3

| Prep. Ex. | Medium No. | Material substrate No. | Functional group | Reagent |
|---|---|---|---|---|
| 1 | Aminated medium 1 | Hydrophilic substrate 1 | Amino group | DEAE[1] |
| 2 | Aminated medium 2 | Hydrophilic substrate 2 | Amino group | DEAE[1] |
| 3 | Aminated medium 3 | Hydrophilic substrate 3 | Amino group | DEAE[1] |
| 4 | Aminated medium 4 | Hydrophilic substrate 4 | Amino group | DEAE[1] |
| 5 | Aminated medium 5 | Hydrophilic substrate 5 | Amino group | DEAE[1] |
| 6 | Aminated medium 6 | Hydrophilic substrate 6 | Amino group | DEAE[1] |
| 7 | Aminated medium 7 | Hydrophilic substrate 7 | Amino group | DEAE[1] |
| 8 | Aminated medium 8 | Hydrophilic substrate 8 | Amino group | DEAE[1] |
| 9 | Aminated medium 9 | Hydrophilic substrate 9 | Amino group | DEAE[1] |
| 12 | Aminated medium 12 | Hydrophilic substrate 12 | Amino group | DEAE[1] |
| 13 | Sulfonated medium 13 | Hydrophilic substrate 4 | Sulfone group | 1,3-PS[2] |
| 14 | Carboxymethylated medium 14 | Hydrophilic substrate 4 | Carboxyl group | CAC[3] |
| 15 | Quaternary ammoniated medium 15 | Hydrophilic substrate 4 | Quaternary ammonium group | GTA[4] |
| 16 | Sulfonated medium 16 | Hydrophilic substrate 2 | Sulfone group | 1,3-PS[2] |
| 17 | Carboxymethylated medium 17 | Hydrophilic substrate 2 | Carboxyl group | CAC[3] |
| 18 | Quaternary ammoniated medium 18 | Hydrophilic substrate 2 | Quaternary ammonium group | GTA[4] |

[1] DEAE: Diethylamino ethanol
[2] 1,3-PS: 1,3-propane sultone
[3] CAC: Sodium monochloroacetate
[4] GTA: Glycidyl trimethylammonium chloride Example 1

Hydrophilicity and alkali resistance of hydrophilic substrate 4 obtained in Preparation Example 4 were evaluated in a room adjusted at 25° C.±2° C.

The hydrophilicity was evaluated by such a method that a protein solution was injected into a packed column and an empty column, a certain amount of elutes were collected, and ultraviolet absorbancies at 280 nm of the elutes were measured and compared to measure the recovery ratio. Namely, functions of the respective columns were compared by a method utilizing such a phenomenon that when the substrate is hydrophobic, proteins are hydrophobically adsorbed to the substrate, thus lowering the recovery ratio, and on the contrary, when the substrate is highly hydrophilic, the recovery ratio tends to be high. In this Example, as the proteins, ovalbumin (egg white), α-chymotrypsinogen A (bovine), myoglobin (horse) and lysozyme (egg) (each manufactured by Sigma-Aldrich Japan K.K.) and cytochrome C (horse) (manufactured by Wako Pure Chemical Industries, Ltd.) were used.

Specifically, a stainless steel column having an inner diameter of 10.7 mm and a length of 150 mm was filled with a medium comprising hydrophilic substrate 4 by a slurry packing method to prepare a packed column. As an eluent, a solution containing a 0.1M phosphate buffer solution (pH 6.8) and 0.2M sodium sulfate was made to flow at a flow rate of 1.0 mL/min, 0.1 mL of the above proteins dissolved at a concentration of 2.0 mg/mL in the above eluent were injected, and from 4 minutes after the injection, 20 mL of the elute was collected. Further, as an empty column, a stainless steel column having an inner diameter of 10.7 mm and a length of 75 mm was used for the purpose of preventing dispersion of the protein solution, and in the same manner as above, from 2 minutes after the injection, 20 mL of the elute was collected. Recovery ratios of various proteins were determined by relative comparison with the absorbances of proteins collected from the empty column being 100%.

As a result, recovery ratios of at least 95% were achieved with respect to all the proteins, and hydrophilic substrate 4 was confirmed to be highly hydrophilic.

Further, the alkali resistance was evaluated by comparison with the amount of formation of carboxyl groups by immersion in a sodium hydroxide aqueous solution. Namely, after well washing with pure water, 10 mL of hydrophilic substrate 4 was weighed by a chromatography tube having an inner diameter of 20 mm equipped with a glass filter at the bottom, and put in two 80 mL sample bottles with a lid. 60 mL of a 5N sodium hydroxide aqueous solution was added to one sample bottle, and 60 mL of pure water was added to the other, and the bottles were tightly closed, the respective slurry liquids were mixed, and the bottles were stored at rest at 25° C. for 4 weeks. The whole of the respective hydrophilic substrates 4 after storage were washed well with a 0.5N HCl solution, and then washed well with pure water, and the amount of carboxyl groups was measured by titration with a 0.1N sodium hydroxide solution. From the difference in the amount of carboxyl groups between these hydrophilic substrates, the amount of carboxyl groups formed by hydrolysis by immersion in a 5N sodium hydroxide solution was calculated.

As a result, the amount of carboxyl groups formed in hydrophilic substrate 4 is 8.3 milliequivalent per 1 L of the substrate.

Example 2

Hydrophilicity and alkali resistance of hydrophilic substrate 5 obtained in Preparation Example 5 were evaluated.

Namely, the hydrophilicity was evaluated in accordance with the method disclosed in Example 1. As a result, the recovery ratios of the respective proteins were 95%, and hydrophilic substrate 5 was confirmed to be highly hydrophilic.

Further, the alkali resistance was evaluated by immersing hydrophilic substrate 5 in an aqueous alkaline solution for 4 weeks in accordance with the method disclosed in Example 1. The alkali resistance of the substrate after immersion was evaluated by the method disclosed in Example 1 and as a result, the amount of carboxyl groups formed in hydrophilic substrate 5 was 10.5 milliequivalent per 1 L of the substrate.

Example 3

Hydrophilicity and alkali resistance of hydrophilic substrate 6 obtained in Preparation Example 6 were evaluated in accordance with the methods disclosed in Example 1.

As a result, the recovery ratios of the respective proteins were 95%, and hydrophilic substrate 6 was confirmed to be highly hydrophilic. Further, the amount of carboxyl groups formed in hydrophilic substrate 6 was 12.4 milliequivalent per 1 L of the substrate.

Example 4

Hydrophilicity and alkali resistance of hydrophilic substrate 7 obtained in Preparation Example 7 were evaluated in accordance with the methods disclosed in Example 1.

As a result, the recovery ratios of the respective proteins were 95%, and hydrophilic substrate 6 was confirmed to be highly hydrophilic. Further, the amount of carboxyl groups formed in hydrophilic substrate 7 was 10.6 milliequivalent per 1 L of the substrate.

Example 5

The ion exchange capacity of aminated medium 4 obtained in Preparation Example 4 was measured by the following method. Namely, in the same manner as in Example 1, 10 mL of aminated medium 4 was weighed, washed well with a 1N sodium hydroxide aqueous solution and with pure water in this order, and subjected to measurement by titration with 0.1N hydrochloric acid. As a result, the ion exchange capacity of aminated medium 4 was 45 milliequivalent per 1 L of the medium.

Further, the alkali resistance of aminated medium 4 was evaluated by the following method. Namely, the adsorption capacities of bovine serum albumin (hereinafter referred to as BSA) to aminated media immersed and not immersed in a sodium hydroxide aqueous solution, and the eluted volumes of acidic proteins under certain constant elution conditions, were measured. The conditions for immersion in a sodium hydroxide aqueous solution were the same as the conditions for evaluation of the alkali resistance of the hydrophilic substrate in Example 1 except that the immersion period was 12 weeks.

(Measurement of BSA Adsorption Capacity)

After washing well with pure water, accurately 3 mL of aminated medium 4 was weighed by using a chromatography tube having an inner diameter of 10 mm equipped with glass filter at the bottom. Aminated medium 4 was washed three times with a 50 mM trisaminomethane buffer solution (pH 8.5) in an amount of 10 times the capacity of aminated medium 4, and the medium was put in a 50 mL measuring flask. 10 mL of the above trisaminomethane buffer solution containing BSA at a concentration of 20 mg/mL was added, followed by mixing for 10 minutes so that BSA was adsorbed. Then, the suspension was subjected to filtration with a filter paper to remove the aminated medium 4, and the remaining BSA solution was obtained.

Then, the absorbance at 280 nm of the remaining BSA solution was measured by an ultraviolet spectrophotometer. The remaining BSA amount was determined by a correlation diagram to determine the relation between a BSA solution at a known concentration and the absorbance at 280 nm preliminarily prepared by using an ultraviolet spectrophotometer. The difference between the BSA amount added of 200 mg and the remaining BSA amount was regarded as the BSA adsorption capacity.

As a result, a BSA adsorption capacity was 29.5 mg/mL with respect to aminated medium 4 immersed in pure water, and the BSA adsorption capacity was 26.5 mg/mL with respect to aminated medium 4 immersed in sodium hydroxide for 12 weeks. It was confirmed that their difference i.e. the decrease of the BSA adsorption capacity by an alkali was so small as 3.0 mg/mL.

(Measurement of Eluted Volume of Acid Proteins)

A stainless steel column having an inner diameter of 7.5 mm and a length of 75 mm was filled with aminated medium 4, and using as an initial buffer solution, a 50 mM trisaminomethane buffer solution (pH 8.5), 0.05 mL of a protein-containing sample at a concentration of 1 mg/mL was injected, so that proteins were adsorbed in the column. Then, linear gradient elution was carried out at a flow rate of 1.0 ml/min for 60 minutes so that the final buffer solution was a 50 mM trisaminomethane buffer solution (pH 8.5) containing 0.5M sodium chloride. The eluted proteins were detected at 25±2° C. using an ultraviolet absorption detector UV8020 (manufactured by TOSOH CORPORATION, detection wavelength: 280 nm). As samples, egg white albumin (hereinafter referred to as OVA) and soybean trypsin inhibitor (hereinafter referred to as STI) were used. The amount of the eluent eluted from the beginning of the linear gradient elution until peak top of various proteins appeared was measured and regarded as the eluted volume.

As a result, the eluted volume of OVA was 16.2 mL and the eluted volume of STI was 28.0 mL with respect to aminated medium 4 immersed in pure water. On the other hand, the eluted volume of OVA was 15.3 mL and the eluted volume of STI was 27.0 mL with respect to aminated medium 4 immersed in a sodium hydroxide solution for 12 weeks. Namely, it was found that the eluted volumes were decreased by 0.9 mL in the case of OVA and 1.0 mL in the case of STI by an alkali. That is, it was confirmed that the change of the eluted volume was small, in other words, the protein holding power does not substantially change even when the aminated medium is immersed in an aqueous alkaline solution.

(Evaluation of Hardness of Aminated Medium)

To measure properties during distribution of aminated medium 4, aminated medium 4 (volume average particle size: 74 μm, standard deviation: 13.4 μm) obtained by classification with a sieving was packed in a stainless steel column having an inner diameter of 10.7 mm and a length of 150 mm by a slurry packing method. Pure water was made to flow by a constant flow pump (maximum flow rate: 10 mL/min) at from 0 to 10 mL/min, and the pressure loss at each flow rate was measured using a Bourdon tube pressure gauge capable of measurement up to 400 kPa. Then, aminated medium 4 was withdrawn from the column, and the pressure loss at the same flow rate of the liquid delivery system using an empty column was measured to calculate the net pressure loss of the medium bed.

As a result, the flow rate and the pressure loss showed linear relation up to a maximum flow rate of 10 mL/min (linear flow rate: 667 cm/hr), and the pressure loss at the maximum flow rate was 78 kPa.

Example 6

The ion exchange capacity of aminated medium 5 obtained in Preparation Example 5 was measured in accordance with the method disclosed in Example 5. As a result, the ion exchange capacity of aminated medium 5 was 85 milliequivalent per 1 L of the medium. Further, the alkali resistance and the hardness of aminated medium 5 were evaluated in accordance with the methods disclosed in Example 5. The results are as follows.

(BSA Adsorption Capacity)

The BSA adsorption capacity was 37.4 mg/mL with respect to aminated medium 5 immersed in pure water, and the BSA adsorption capacity was 35.9 mg/mL with respect to aminated medium immersed in sodium hydroxide for 12 weeks. It was confirmed that the difference i.e. the decrease of the protein adsorption capacity by an alkali was so small as 1.5 mg/mL.

(Eluted Volume of Acidic Proteins)

The eluted volume of OVA was 17.2 mL and the eluted volume of STI was 25.2 mL with respect to aminated medium 5 immersed in pure water. On the other hand, the eluted volume of OVA was 16.8 mL and the eluted volume of STI was 24.8 mL with respect to aminated medium 5 immersed in sodium hydroxide for 12 weeks. Namely, it was found that the eluted volumes were decreased by 0.4 mL in the case of OVA and by 0.4 mL in the case of STI by an alkali. That is, it was confirmed that the holding power does not substantially change even when aminated medium 5 is immersed in an aqueous alkaline solution.

(Hardness of Aminated Medium)

To measure properties during distribution of aminated medium 5, aminated medium 5 (volume average particle size: 72 μm, standard deviation: 14.1 μm) obtained by classification with a sieving was packed in a stainless steel column having an inner diameter of 10.7 mm and a length of 150 mm by a slurry packing method. Then, the same operation as in Example 5 was carried out to determine the relation between the flow rate and the pressure loss. As a result, the flow rate and the pressure loss showed linear relation up to a maximum flow rate of 10 mL/min (linear flow rate: 667 cm/hr), and the pressure loss at a maximum flow rate was 80 kPa.

Example 7

The ion exchange capacity of aminated medium 6 obtained in Preparation Example 6 was measured in accordance with the method disclosed in Example 5. As a result, the ion exchange capacity of aminated medium 6 was 70 milliequivalent per 1 L of the medium. Further, the alkali resistance and the hardness of aminated medium 6 were evaluated in accordance with the methods disclosed in Example 5. The results are as follows.

(BSA Adsorption Capacity)

The BSA adsorption capacity was 26.1 mg/mL with respect to aminated medium 6 immersed in pure water, and the BSA adsorption capacity was 24.7 mg/mL with respect to aminated medium 6 immersed in sodium hydroxide for 12 weeks. It was confirmed that the difference i.e. the decrease of the protein adsorption capacity by an alkali was so small as 1.4 mg/mL.

(Eluted Volume of Acidic Proteins)

The eluted volume of OVA was 17.9 mL and the eluted volume of STI was 26.3 mL with respect to aminated medium 6 immersed in pure water. On the other hand, the eluted volume of OVA was 17.0 mL and the eluted volume of STI was 24.9 mL with respect to aminated medium 6 immersed in the sodium hydroxide solution for 12 weeks. Namely, it was found that the eluted volumes were decreased by 0.9 mL in the case of OVA and by 1.4 mL in the case of STI with respect to aminated medium 6 immersed in the sodium hydroxide solution for 12 weeks. That is, it was confirmed that the holding power does not substantially change even when aminated medium 6 is immersed in an aqueous alkaline solution.

(Hardness of Aminated Medium)

To measure properties during distribution of aminated medium 6, aminated medium 6 (volume average particle size: 76 μm, standard deviation: 13.1 μm) obtained by classification with a sieving was packed in a stainless steel column having an inner diameter of 10.7 mm and a length of 150 mm by a slurry packing method. Then, the same operation as in Example 5 was carried out to determine the relation between the flow rate and the pressure loss. As a result, the flow rate and the pressure loss showed linear relation up to a maximum flow rate of 10 mL/min (linear flow rate: 667 cm/hr), and the pressure loss at a maximum flow rate was 75 kPa.

Example 8

The ion exchange capacity of aminated medium 7 obtained in Preparation Example 7 was measured in accordance with the method disclosed in Example 5. As a result, the ion exchange capacity of aminated medium 7 was 125 milliequivalent per 1 L of the medium. Further, the alkali resistance and the hardness of aminated medium 7 were evaluated in accordance with the methods disclosed in Example 5. The results are as follows.
(BSA Adsorption Capacity)

The BSA adsorption capacity was 26.2 mg/mL with respect to aminated medium 7 immersed in pure water, and the BSA adsorption capacity was 25.2 mg/mL with respect to aminated medium 7 immersed in sodium hydroxide for 12 weeks. It was confirmed that the difference i.e. the decrease of the protein adsorption capacity by an alkali was so small as 1.0 mg/mL.
(Eluted Volume of Acidic Proteins)

The eluted volume of OVA was 17.6 mL and the eluted volume of STI was 28.2 mL with respect to aminated medium 7 immersed in pure water. On the other hand, the eluted volume of OVA was 16.8 mL and the eluted volume of STI was 27.4 mL with respect to aminated medium 7 immersed in the sodium hydroxide solution for 12 weeks. It was found that the eluted volumes were decreased by 0.8 mL in the case of OVA and by 0.8 mL in the case of STI with respect to aminated medium 7 immersed in the sodium hydroxide solution for 12 weeks. That is, it was confirmed that the holding power does not substantially change even when aminated medium 7 is immersed in an aqueous alkaline solution.
(Hardness of Aminated Medium)

To measure properties during distribution of aminated medium 7, aminated medium 7 (volume average particle size: 74 μm, standard deviation: 13.1 μm) obtained by classification with a sieving was packed in a stainless steel column having an inner diameter of 10.7 mm and a length of 150 mm by a slurry packing method. Then, the same operation as in Example 5 was carried out to determine the relation between the flow rate and the pressure loss. As a result, the flow rate and the pressure loss showed linear relation up to a maximum flow rate of 10 mL/min (linear flow rate: 667 cm/hr), and the pressure loss at a maximum flow rate was 77 kPa.

Example 9

The alkali resistance of aminated medium 9 obtained in Preparation Example 9 was evaluated by measurement of the eluted volume under certain constant elution conditions of acidic proteins using the aminated medium immersed in a sodium hydroxide aqueous solution and the aminated medium not immersed. The conditions for immersion in the sodium hydroxide aqueous solution were the same as in Example 5.
(Measurement of Eluted Volume of Acid Proteins)

A stainless steel column having an inner diameter of 4.6 mm and a length of 35 mm was filled with aminated medium 9, and using as an initial buffer solution, a 50 mM trisaminomethane buffer solution (pH 8.5), 0.02 mL of a protein-containing sample at a concentration of 1 mg/mL was injected, so that proteins were adsorbed in the column. Then, linear gradient elution was carried out at a flow rate of 1.0 ml/min for 30 minutes so that the final buffer solution was a 50 mM trisaminomethane buffer solution (pH 8.5) containing 0.5M sodium chloride. The eluted proteins were detected at 25±2° C. using an ultraviolet absorption detector UV8020 (manufactured by TOSOH CORPORATION, detection wavelength: 280 nm). As samples, OVA and STI were used. The amount of the eluent eluted from the beginning of the linear gradient elution until peak top of various proteins appeared was measured and regarded as the eluted volume.

As a result, the eluted volume of OVA was 6.5 mL and the eluted volume of STI was 13.5 mL with respect to aminated medium 9 washed with pure water. On the other hand, the eluted volume of OVA was 6.3 mL and the eluted volume of STI was 13.2 mL with respect to aminated medium 9 immersed in the sodium hydroxide solution for 12 weeks and then washed well with pure water. The eluted volumes were decreased by 0.2 mL in the case of OVA and by 0.3 mL in the case of STI with respect to aminated medium 9 immersed in the sodium hydroxide solution. The amounts of change are nearly within the range of experimental errors, and it was found that the eluted volumes does not substantially change even when aminated medium 9 is immersed in an aqueous alkaline solution.

Comparative Example 1

The alkali resistance of hydrophilic substrate 1 obtained in Preparation Example 1 was evaluated in accordance with the method disclosed in Example 1. The amount of formation of carboxyl groups in the hydrophilic medium 1 was 125 milliequivalent per 1 L of the substrate.

Comparative Example 2

The alkali resistance of hydrophilic substrate 2 obtained in Preparation Example 2 was evaluated in accordance with the method disclosed in Example 1. The amount of formation of carboxyl groups in the hydrophilic medium 2 was 137 milliequivalent per 1 L of the substrate.

Comparative Example 3

The ion exchange capacity of aminated medium 1 obtained in Preparation Example 1 was measured in accordance with the method disclosed in Example 5. As a result, the ion exchange capacity of aminated medium 1 was 128 milliequivalent per 1 L of the medium. Further, the alkali resistance of aminated medium 1 was evaluated in accordance with the method disclosed in Example 5.

The results are as follows.
(BSA Adsorption Capacity)

The BSA adsorption capacity was 35.6 mg/mL with respect to aminated medium 1 immersed in pure water, and the BSA adsorption capacity was 0.6 mg/mL with respect to aminated medium 1 immersed in the sodium hydroxide solution for 12 weeks. It was confirmed that the adsorption capacity by aminated medium 1 was remarkably decreased by so much as 35.0 mg/mL by immersion in the sodium hydroxide solution for 12 weeks.
(Eluted Volume of Acidic Proteins)

The eluted volume of OVA was 17.8 mL and the eluted volume of STI was 25.9 mL with respect to aminated medium 1 immersed in pure water. On the other hand, the eluted volume of OVA was 4.6 mL and the eluted volume of STI was 7.8 mL with respect to aminated medium 1 immersed in the sodium hydroxide solution for 12 weeks. It was found that the eluted volumes were remarkably decreased by 13.2 mL in the case of OVA and by 18.1 mL in the case of STI with respect to aminated medium 1 immersed in the sodium hydroxide solution for 12 weeks. That is, it was confirmed that the holding power substantially changes when aminated medium 1 is immersed in an aqueous alkaline solution.

Comparative Example 4

The ion exchange capacity of aminated medium 2 obtained in Preparation Example 2 was measured in accordance with the method disclosed in Example 5. As a result, the ion exchange capacity of aminated medium 2 was 119 milliequivalent per 1 L of the medium. Further, the alkali resistance of aminated medium 2 was evaluated in accordance with the method disclosed in Example 5. The results are as follows.

(BSA Adsorption Capacity)

The BSA adsorption capacity was 33.9 mg/mL with respect to aminated medium 2 immersed in pure water, and the BSA adsorption capacity was 1.0 mg/mL with respect to aminated medium 2 immersed in sodium hydroxide for 12 weeks. It was confirmed that the adsorption capacity by aminated medium 2 was remarkably decreased by so much as 32.9 mg/mL by immersion in the sodium hydroxide solution for 12 weeks.

(Eluted Volume of Acidic Proteins)

The eluted volume of OVA was 16.6 mL and the eluted volume of STI was 22.3 mL with respect to aminated medium 2 immersed in pure water. On the other hand, the eluted volume of OVA was 4.9 mL and the eluted volume of STI was 8.4 mL with respect to aminated medium 2 immersed in sodium hydroxide for 12 weeks. It was found that the eluted volumes were remarkably decreased by 11.7 mL in the case of OVA and by 13.9 mL in the case of STI with respect to aminated medium 2 immersed in the sodium hydroxide solution for 12 weeks. That is, it was confirmed that the holding power substantially changes when aminated medium 2 is immersed in an aqueous alkaline solution.

Comparative Example 5

The ion exchange capacity of aminated medium 3 obtained in Preparation Example 3 was measured in accordance with the method disclosed in Example 5. As a result, the ion exchange capacity of aminated medium 3 was 106 milliequivalent per 1 L of the medium. Further, the alkali resistance and the hardness of the aminated medium were evaluated in accordance with the methods disclosed in Example 5. The results are as follows.

(BSA Adsorption Capacity)

The BSA adsorption capacity was 30.7 mg/mL with respect to aminated medium 3 immersed in pure water, and the BSA adsorption capacity was 0.7 mg/mL with respect to aminated medium 3 immersed in the sodium hydroxide solution for 12 weeks. It was confirmed that the adsorption capacity by aminated medium 3 immersed in the sodium hydroxide solution for 12 weeks was remarkably decreased by so much as 30.0 mg/mL.

(Hardness of Aminated Medium)

To measure properties during distribution of aminated medium 3, aminated medium 3 (volume average particle size: 76 μm, standard deviation: 12.1 μm) obtained by classification with a sieving was packed in a stainless steel column having an inner diameter of 10.7 mm and a length of 150 mm by a slurry packing method. Then, the same operation as in Example 5 was carried out to determine the relation between the flow rate and the pressure loss. As a result, the relation between the flow rate and the pressure loss started to depart from a straight line when the flow rate exceeded 6 mL/min (linear flow rate: 400 cm/hr), and the increase in the pressure became significant. At a flow rate of 10 mL/min, the influence of the pressure loss was so significant that the eluent could not flow.

Comparative Example 6

The alkali resistance of aminated medium 8 obtained in Preparation Example 8 was evaluated in accordance with the method of measuring the eluted volume of acidic proteins disclosed in Example 9. The results are as follows.

(Eluted Volume of Acidic Proteins)

The eluted volume of OVA was 7.5 mL and the eluted volume of STI was 15.8 mL with respect to aminated medium 8 washed with pure water. On the other hand, the eluted volume of OVA was 2.5 mL and the eluted volume of STI was 4.4 mL with respect to aminated medium 8 immersed in the sodium hydroxide solution for 12 weeks. It was found that the eluted volumes were decreased by 5.0 mL in the case of OVA and by 11.4 mL in the case of STI with respect to aminated medium 8 immersed in the sodium hydroxide solution, and substantially no proteins could be held.

Example 10

The hydrophilicity and the alkali resistance of hydrophilic substrate 10 obtained in Preparation Example 10 were evaluated in accordance with the methods disclosed in Example 1. As a result, the recovery ratios were at least 95% with respect to all the proteins, and hydrophilic substrate 10 was confirmed to be highly hydrophilic. Further, the amount of formation of carboxyl groups in hydrophilic substrate 10 was 25.5 milliequivalent per 1 L of the substrate.

Example 11

The hydrophilicity and the alkali resistance of hydrophilic substrate 11 obtained in Preparation Example 11 were evaluated in accordance with the methods disclosed in Example 1. As a result, the recovery ratios were at least 95% with respect to all the proteins, and hydrophilic substrate 11 was confirmed to be highly hydrophilic. Further, the amount of formation of carboxyl groups in hydrophilic substrate 11 was 28.0 milliequivalent per 1 L of the substrate.

Example 12

The ion exchange capacity of aminated medium 12 obtained in Preparation Example 12 was measured in accordance with the method disclosed in Example 5. As a result, the ion exchange capacity of aminated medium 12 was 75 milliequivalent per 1 L of the medium. Further, the alkali resistance of the aminated medium was evaluated in accordance with the method disclosed in Example 5. The results are as follows.

(BSA Adsorption Capacity)

The BSA adsorption capacity was 34.8 mg/mL with respect to aminated medium 12 immersed in pure water, and the BSA adsorption capacity was 29.0 mg/mL with respect to aminated medium 12 immersed in sodium hydroxide for 12 weeks. It was confirmed that the difference i.e. the decrease of the protein adsorption capacity by an alkali was so small as 5.8 mg/mL.

(Eluted Volume of Acidic Proteins)

The eluted volume of OVA was 18.2 mL and the eluted volume of STI was 27.2 mL with respect to aminated medium 12 immersed in pure water. On the other hand, the eluted volume of OVA was 16.4 mL and the eluted volume of STI was 24.8 mL with respect to aminated medium 12 immersed in sodium hydroxide for 12 weeks. Namely, it was found that the eluted volumes were decreased by 1.8 mL in the case of OVA and by 2.6 mL in the case of STI by an alkali. That is, it was confirmed that the holding power does not substantially change even when aminated medium 12 is immersed in an aqueous alkaline solution.

Example 13

The ion exchange capacity of quaternary ammoniated medium 15 obtained in Preparation Example 15 was measured in accordance with the method disclosed in Example 5. As a result, the ion exchange capacity of quaternary ammoniated medium 15 was 95 milliequivalent per 1 L of the medium. Further, the alkali resistance of quaternary ammoniated medium 15 was evaluated in accordance with the method disclosed in Example 5. The results are as follows.

(BSA Adsorption Capacity)

The BSA adsorption capacity was 43.5 mg/mL with respect to quaternary ammoniated medium 15 immersed in pure water, and the BSA adsorption capacity was 37.4 mg/mL with respect to quaternary ammoniated medium 15 immersed in sodium hydroxide for 12 weeks. It was confirmed that the difference i.e. the decrease of the protein adsorption capacity by an alkali was so small as 6.1 mg/mL.

(Eluted Volume of Acidic Proteins)

The eluted volume of OVA was 20.4 mL and the eluted volume of STI was 31.0 mL with respect to quaternary ammoniated medium 15 immersed in pure water. On the other hand, the eluted volume of OVA was 18.4 mL and the eluted volume of STI was 28.1 mL with respect to quaternary ammoniated medium 15 immersed in sodium hydroxide for 12 weeks. Namely, it was found that the eluted volumes were decreased by 1.8 mL in the case of OVA and by 2.6 mL in the case of STI by an alkali. That is, it was confirmed that the holding power does not substantially change even when quaternary ammoniated medium 15 is immersed in an aqueous alkaline solution.

Example 14

The ion exchange capacity of sulfonated medium 13 obtained in Preparation Example 13 was measured by the following method. Namely, in the same manner as in Example 1, 10 mL of sulfonated medium 13 was weighed, washed well with 1N hydrochloric acid and pure water in this order, and subjected to measurement by titration with a 0.1N sodium hydroxide aqueous solution. As a result, the ion exchange capacity of sulfonated medium 13 was 90.0 milliequivalent (pH 7.0) per 1 L of the medium.

Then, the alkali resistance of sulfonated medium 13 was evaluated by the following method. Namely, the ion exchange capacities of sulfonated medium 13 immersed and not immersed in a sodium hydroxide aqueous solution were measured at a pH of 3.5 and at a pH of 8.5, to evaluate the alkali resistance from the difference in the ion exchange capacity between at a pH of 3.5 and at a pH of 8.5. Namely, in a medium comprising a polymer derived from a (meth)acryloyl monomer, sulfonic acid groups are substantially ionized at a pH of 3.5 or below, but carboxylic acid groups are not ionized until the pH becomes 3.5 or higher, they start being ionized at a pH of 3.5 or higher, and are substantially completely ionized at a pH up to 8.5. Accordingly, from the change of the difference in the ion exchange capacity between at a pH of 3.5 and at a pH of 8.5, the amount of carboxylic acid formed by ester hydrolysis can be determined. Further, the amount of discharge of sulfonic acid groups can be determined by the change in the ion exchange capacity at a pH of 3.5. The conditions for the immersion in the sodium hydroxide aqueous solution were the same as the conditions for evaluation of the alkali resistance of the hydrophilic substrate in Example 1 except that the immersion period was 12 weeks.

As a result, the ion exchange capacities per 1 L of sulfonated medium 13 immersed in pure water at a pH of 3.5 and at a pH of 8.5 were 86.2 milliequivalent and 90.5 milliequivalent, respectively. On the other hand, the ion exchange capacities per 1 L of sulfonated medium 13 immersed in the sodium hydroxide solution for 12 weeks at a pH of 3.5 and at a pH of 8.5 were 85.8 milliequivalent and 90.8 milliequivalent, respectively. Accordingly, the amount of discharge of sulfonic acid groups and the amount of formation of carboxylic acid were so small as 0.4 milliequivalent and 5.0 milliequivalent, respectively, and sulfonated medium 13 was confirmed to be stable.

Example 15

The ion exchange capacity of carboxymethylated medium 14 obtained in Preparation Example 14 was measured in accordance with the method disclosed in Example 14. As a result, the ion exchange capacity of carboxymethylated medium 14 was 64.5 milliequivalent (pH 8.5) per 1 L of the medium.

Then, the alkali resistance of carboxymethylated medium was evaluated by the following method. Namely, it was evaluated by the change in the ion exchange capacity at a pH of 8.5 between carboxymethylated medium immersed and not immersed in a sodium hydroxide aqueous solution. However, by this method, a carboxylic acid will be formed by hydrolysis of an ester group containing a carboxymethyl group, and accordingly it is considered that the alkali resistance of the medium can not accurately be measured. However, this method is employed since there is no other proper method. The conditions for immersion in the sodium hydroxide aqueous solution were the same as the conditions for evaluation of the alkali resistance of the hydrophilic substrate in Example 1 except that the immersion period was 12 weeks.

As a result, the ion exchange capacity of carboxymethylated medium 14 immersed in pure water at a pH of 8.5 were 64.5 milliequivalent per 1 L of the medium. On the other hand, it was 64.5 milliequivalent with respect to carboxymethylated medium 14 immersed in the sodium hydroxide solution for 12 weeks. Namely, there was no change in the ion exchange capacity at all.

Comparative Example 7

The ion exchange capacity of quaternary ammoniated medium 18 obtained in Preparation Example 18 was measured in accordance with the method disclosed in Example 5. As a result, the ion exchange capacity of quaternary ammoniated medium 18 was 129 milliequivalent per 1 L of the medium. Further, the alkali resistance of quaternary ammoniated medium 18 was evaluated in accordance with the method disclosed in Example 5. The results are as follows.

(BSA Adsorption Capacity)

The BSA adsorption capacity was 38.8 mg/mL with respect to quaternary ammoniated medium 18 immersed in pure water, and the BSA adsorption capacity was 1.4 mg/mL with respect to quaternary ammoniated medium 18 immersed in sodium hydroxide for 12 weeks. It was confirmed that the adsorption capacity by quaternary ammoniated medium 18 immersed in the sodium hydroxide solution for 12 weeks was remarkably decreased by so much as 37.4 mg/mL.

(Eluted Volume of Acidic Proteins)

The eluted volume of OVA was 21.8 mL and the eluted volume of STI was 33.2 mL with respect to quaternary ammoniated medium 18 immersed in pure water. On the other hand, the eluted volume of OVA was 5.6 mL and the eluted volume of STI was 10.2 mL with respect to quaternary ammoniated medium 18 immersed in sodium hydroxide for 12 weeks.

Namely, it was found that the eluted volumes were remarkably decreased by 16.2 mL in the case of OVA and by 23.0 mL in the case of STI by an alkali. That is, it was confirmed that the holding power substantially changes when quaternary ammoniated medium 18 is immersed in an aqueous alkaline solution.

Comparative Example 8

The ion exchange capacity of sulfonated medium 16 obtained in Preparation Example 16 was measured in accordance with the method disclosed in Example 14. As a result, the ion exchange capacity of sulfonated medium 16 was 95.4 milliequivalent (pH 7.0) per 1 L of the medium.

Then, the alkali resistance of sulfonated medium 16 was evaluated in accordance with the method disclosed in Example 14. As a result, the ion exchange capacities of sulfonated medium 16 immersed in pure water at a pH of 3.5 and at a pH of 8.5 were 91.2 milliequivalent and 96.4 milliequivalent, per 1 L of the medium, respectively. On the other hand, the ion exchange capacities of sulfonated medium 16 immersed in the sodium hydroxide solution for 12 weeks at a pH of 3.5 and at a pH of 8.5 were 58.6 milliequivalent and 102.8 milliequivalent, per 1 L of the medium, respectively. Accordingly, the amount of discharge of sulfonic acid groups and the amount of formation of carboxylic acid were 32.6 milliequivalent and 44.2 milliequivalent, respectively, and it was confirmed that hydrolysis of ester in a large amount occurred to discharge an alcohol containing a sulfonic acid group.

Comparative Example 9

The ion exchange capacity of carboxymethylated medium 17 obtained in Preparation Example 17 was measured in accordance with the method disclosed in Example 14. As a result, the ion exchange capacity of carboxymethylated medium 17 was 68.8 milliequivalent (pH 8.5) per 1 L of the medium.

Then, the alkali resistance of carboxymethylated medium 17 was evaluated in accordance with the method disclosed in Example 15. The conditions for immersion in the sodium hydroxide aqueous solution were the same as the conditions for evaluation of the alkali resistance of the hydrophilic substrate in Example 1 except that the immersion period was 12 weeks.

As a result, the ion exchange capacity of carboxymethylated medium 17 immersed in pure water at a pH of 8.5 was 68.8 milliequivalent per 1 L of the medium. On the other hand, the ion exchange capacity of carboxymethylated medium 17 immersed in the sodium hydroxide solution for 12 weeks at a pH of 8.5 was 96.4 milliequivalent per 1 L of the medium. Namely, the ion exchange capacity was increased by 27.6 milliequivalent. This increase is due to formation of new carboxylic acid by hydrolysis of ester groups containing no carboxymethyl group, and indicates progress of hydrolysis of the ester groups.

The results of the above Examples and Comparative Examples are shown in Tables 4 to 7.

TABLE 4

| | | Evaluation | |
| --- | --- | --- | --- |
| No. | Hydrophilic substrate No. | Hydrophilicity | Alkali resistance |
| Ex. 1 | Hydrophilic substrate 4 | ≥95% | 8.3 meq/L |
| Ex. 2 | Hydrophilic substrate 5 | 95% | 10.5 meq/L |
| Ex. 3 | Hydrophilic substrate 6 | 95% | 12.4 meq/L |
| Ex. 4 | Hydrophilic substrate 7 | 95% | 10.6 meq/L |
| Ex. 10 | Hydrophilic substrate 10 | ≥95% | 25.5 meq/L |
| Ex. 11 | Hydrophilic substrate 11 | ≥95% | 28.0 meq/L |
| Comp. Ex. 1 | Hydrophilic substrate 1 | — | 125 meq/L |
| Comp. Ex. 2 | Hydrophilic substrate 2 | — | 137 meq/L |

TABLE 5

| | | Evaluation | | | | | |
| --- | --- | --- | --- | --- | --- | --- | --- |
| | | Alkali resistance | | | | | |
| | | | BSA adsorption capacity | | | Amount of decrease of OVA eluted amount | Amount of decrease of STI bonding amount | |
| | Medium No. | Ion exchange capacity | Initial value | Amount of decrease | Rate of decrease | | | Hardness |
| Ex. 5 | Aminated medium 4 | 45 meq/L | 29.5 mg/mL | 3.0 mg/mL | 10.2% | 0.9 mL | 1.0 mL | 78 kPa |
| Ex. 6 | Aminated medium 5 | 85 meq/L | 37.4 mg/mL | 1.5 mg/mL | 4.0% | 0.4 mL | 0.4 mL | 80 kPa |
| Ex. 7 | Aminated medium 6 | 70 meq/L | 26.1 mg/mL | 1.4 mg/mL | 5.4% | 0.9 mL | 1.4 mL | 75 kPa |
| Ex. 8 | Aminated medium 7 | 125 meq/L | 26.2 mg/mL | 1.0 mg/mL | 3.8% | 0.8 mL | 0.8 mL | 77 kpa |
| Ex. 9 | Aminated medium 9 | — | — | — | — | 0.2 mL | 0.3 mL | — |
| Ex. 12 | Aminated medium 12 | 75 meq/L | 34.8 mg/mL | 5.8 mg/mL | 16.7% | 1.8 mL | 2.6 mL | — |
| Ex. 13 | Quaternary ammoniated medium 15 | 95 meq/L | 43.5 mg/mL | 6.1 mg/mL | 14.0% | 1.8 mL | 2.6 mL | — |

TABLE 5-continued

| | | Evaluation | | | | | | |
|---|---|---|---|---|---|---|---|---|
| | | Alkali resistance | | | | | | |
| | | | BSA adsorption capacity | | | Amount of decrease of OVA eluted amount | Amount of decrease of STI bonding amount | |
| | Medium No. | Ion exchange capacity | Initial value | Amount of decrease | Rate of decrease | | | Hardness |
| Comp. Ex. 3 | Aminated medium 1 | 128 meq/L | 35.6 mg/mL | 35.0 mg/mL | 98.4% | 13.2 mL | 18.1 mL | — |
| Comp. Ex. 4 | Aminated medium 2 | 119 meq/L | 33.9 mg/mL | 32.9 mg/mL | 97.1% | 11.7 mL | 13.9 mL | — |
| Comp. Ex. 5 | Aminated medium 3 | 106 meq/L | 30.7 mg/mL | 30.0 mg/mL | 97.7% | — | — | Measurement impossible |
| Comp. Ex. 6 | Aminated medium 8 | — | — | — | — | 5.0 mL | 11.4 mL | — |
| comp. Ex. 7 | Quaternary ammoniated medium 18 | 129 meq/L | 38.8 mg/mL | 37.4 mg/mL | 96.4% | 16.2 mL | 23.0 mL | — |

TABLE 6

| | | Evaluation | | | | |
|---|---|---|---|---|---|---|
| | | Alkali resistance | | | | |
| | | Ion exchange capacity (pH 3.5) | | | Difference in ion exchange capacity (pH 8.5)-(pH 3.5) | |
| | Medium No. | Ion exchange capacity (pH 7.0) | Initial value | Amount of decrease of sulfonic acid groups | Initial value | Amount of increase of carboxylic acid |
| Ex. 14 | Sulfonated medium 13 | 90 meq/L | 86.2 meq/L | 0.4 meq/L | 4.3 meq/L | 5.0 meq/L |
| Comp. Ex. 8 | Sulfonated medium 16 | 95.4 meq/L | 91.2 meq/L | 32.6 meq/L | 5.2 meq/L | 44.2 meq/L |

TABLE 7

| | | Alkali resistance Ion exchange capacity (pH 8.5) | | |
|---|---|---|---|---|
| No. | Medium No. | Initial value | After treatment | Amount of change |
| Ex. 15 | Carboxymethylated medium 14 | 64.5 meq/L | 64.5 meq/L | 0 meq/L |
| Comp. Ex. 9 | Carboxymethylated medium 17 | 68.8 meq/L | 96.4 meq/L | 27.6 meq/L |

INDUSTRIAL APPLICABILITY

To provide a novel medium which has mechanical strength applicable to high speed/high separation, which does not cause nonspecific adsorption of proteins and is thereby sufficiently hydrophilic, and provides a small change in a protein adsorption amount, holding power, etc. even when immersed in a high concentration aqueous alkaline solution. The medium has an effect of adsorbing/desorbing substances (particularly proteins) dissolved in an aqueous solution and is utilized for collection of an aimed substance and for liquid chromatography.

The entire disclosure of Japanese Patent Application No. 2005-169111 filed on Jun. 9, 2005 including specification, claims and summary is incorporated herein by reference in its entirety.

The invention claimed is:

1. A hydrophilic medium comprising crosslinked polymer particles comprising from 20 to 95 mol % of at least one (meth)acryloyl monomer selected from the group consisting of 3,4-epoxycyclohexylmethyl (meth)acrylate, 3,4-epoxycyclohexylethyl (meth)acrylate, and 3,4-epoxycyclohexylpropyl (meth)acrylate; and from 80 to 5 mol % of repeating units represented by the following formula (3):

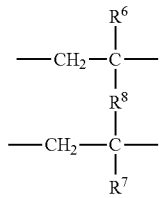

wherein each of $R^6$ and $R^7$ which are independent of each other, is a hydrogen atom or a $C_{1-3}$ alkyl group, and $R^8$ is a bivalent organic group having an aryl group, an oxycarbonyl group or a carbamoyl group.

2. The medium according to claim 1, wherein the crosslinked polymer particles are obtained by polymerization of repeating units of the at least one (meth)acryloyl monomer and the repeating units represented by the formula (3).

3. The medium according to claim 1, wherein the crosslinked polymer particles are porous particles having an average particle size of from 5 to 300 µm.

4. The medium according to claim 1, further comprising hydrophilic groups on the surface of the crosslinked polymer particles.

5. The medium according to claim 4, which is obtained by reacting a hydrophilizing agent with said medium comprising crosslinked polymer particles.

6. The medium according to claim 4, wherein when pullulan is used as a standard substance and pure water is used as an eluent, the molecular weight exclusion limit is from 500,000 to 2,000,000.

7. The medium according to claim 1, wherein the total of the repeating units of the at least one (meth)acryloyl monomer and the repeating unit represented by the formula (3) is 100 mol %.

8. The medium according to claim 1, further comprising ion exchange groups on the surface of the crosslinked polymer particles.

9. The medium according to claim 8, wherein the ion exchange groups are introduced by subjecting the epoxy groups of the crosslinked polymer particles to ring opening.

10. The medium according to claim 8, wherein the ion exchange groups are introduced by epoxidizing the crosslinked polymer particles, and subjecting the epoxy groups to ring opening.

11. The medium according to claim 8, wherein the ion exchange groups are at least one member selected from the group consisting of a sulfonic acid group, a carboxyl group, a primary amino group, a secondary amino group, a tertiary amino group and a quaternary ammonium group.

12. A method of separating proteins, which uses the medium as defined in claim 8 as a medium for chromatography.

* * * * *